United States Patent
Horst

(10) Patent No.: US 6,720,686 B1
(45) Date of Patent: Apr. 13, 2004

(54) REDUCED NOISE DYNAMOELECTRIC MACHINE

(75) Inventor: Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 37 days.

(21) Appl. No.: 09/678,041

(22) Filed: Oct. 3, 2000

(51) Int. Cl.$^7$ .............. H02K 5/24; H02K 1/12; H02K 1/22

(52) U.S. Cl. .............. 310/51; 310/254; 310/261

(58) Field of Search .............. 310/51, 254, 261, 310/90.5, 216, 269, 12–14, 156.38–156.47, 81, 156.58

(56) References Cited

U.S. PATENT DOCUMENTS

| | | | |
|---|---|---|---|
| 747,698 A | | 12/1903 | Geisenhoner |
| 3,260,871 A | * | 7/1966 | Long .............. 310/49 |
| 3,919,607 A | * | 11/1975 | Habock et al. .............. 318/135 |
| 4,132,932 A | * | 1/1979 | Wanlass .............. 310/155 |
| 4,164,696 A | | 8/1979 | Kastilahn et al. .............. 318/696 |
| 4,213,070 A | | 7/1980 | Lund et al. .............. 310/71 |
| 4,217,508 A | * | 8/1980 | Uzuka .............. 310/46 |
| 4,249,116 A | | 2/1981 | Hieda .............. 318/254 |
| 4,253,053 A | | 2/1981 | Ray et al. .............. 318/701 |
| 4,427,910 A | | 1/1984 | Richter et al. .............. 310/214 |
| 4,447,771 A | | 5/1984 | Whited .............. 318/661 |
| 4,488,101 A | | 12/1984 | Studtmann .............. 318/800 |
| 4,500,824 A | | 2/1985 | Miller .............. 318/701 |
| 4,520,302 A | | 5/1985 | Hill et al. .............. 318/696 |
| 4,563,619 A | | 1/1986 | Davis et al. .............. 318/138 |
| 4,661,756 A | | 4/1987 | Murphy et al. .............. 318/701 |
| 4,670,696 A | | 6/1987 | Byrne et al. .............. 318/701 |
| 4,672,253 A | | 6/1987 | Tajimal et al. .............. 310/269 |
| 4,712,050 A | | 12/1987 | Nagasawa et al. .............. 318/254 |
| 4,731,570 A | | 3/1988 | Lee .............. 318/696 |
| 4,761,580 A | | 8/1988 | Hein et al. .............. 310/214 |
| 4,774,424 A | * | 9/1988 | Habermann .............. 310/187 |

(List continued on next page.)

FOREIGN PATENT DOCUMENTS

| | | | |
|---|---|---|---|
| DE | 4 036 565 C1 | 5/1992 | .............. H02P/8/00 |
| EP | 0 557 811 A1 | 9/1993 | .............. H02P/6/02 |
| EP | 0 749 202 A1 | 12/1996 | .............. H02P/7/05 |
| GB | 2 167 253 A | 5/1986 | .............. H02P/6/00 |
| GB | 2 167 910 A | 6/1986 | .............. H02K/1/06 |
| JP | 03-089897 A | 4/1991 | .............. H02P/8/00 |
| JP | 07-298669 | 11/1995 | |
| WO | WO 93/05564 | 3/1993 | .............. H02P/6/02 |
| WO | WO 94/28618 | 12/1994 | .............. H02P/6/02 |

OTHER PUBLICATIONS

Electric Motors and Motor Controls; Jeff Keljik; Delmar Publishers 1995; pp. 9–12.*

(List continued on next page.)

*Primary Examiner*—Nicholas Ponomarenko
*Assistant Examiner*—Guillermo Perez
(74) *Attorney, Agent, or Firm*—Howrey Simon Arnold & White LLP

(57) ABSTRACT

An electromagnetic machine includes a rotor having a plurality of poles and a stator also having a plurality of poles. The poles for the rotor are divided into a first and second set of radially opposed pairs. The first set has uniform faced poles. The second set has a notched face. The stator includes radially opposed pairs of poles having uniform faced poles. The rotor and stator are disposed for movement relative to each other such that the first and second sets of poles for the rotor are movable in relation to the radially opposed pairs of the stator. The electrical interaction between uniform faced poles of the rotor with uniform faced poles of the stator produces a first normal force profile. The electrical interaction between notched faced poles of the rotor with uniform faced poles of the stator produces a second normal force profile. The first and second normal forces act dynamically in time or position on the stator as the rotor moves in relation to the stator. Thus, the noise spike at the harmonics of the commutation frequency are reduced.

11 Claims, 28 Drawing Sheets

U.S. PATENT DOCUMENTS

| | | | |
|---|---|---|---|
| 4,849,873 A | 7/1989 | Vanderhelst | 363/55 |
| 4,859,921 A | 8/1989 | Archer | 318/599 |
| 4,868,477 A | 9/1989 | Anderson et al. | 318/696 |
| 4,933,584 A | 6/1990 | Harms et al. | 310/162 |
| 4,933,621 A | 6/1990 | MacMinn et al. | 318/696 |
| 4,943,760 A | 7/1990 | Byrne et al. | 318/701 |
| 4,961,038 A | 10/1990 | MacMinn | 318/696 |
| 5,072,166 A | 12/1991 | Ehsani | 318/696 |
| 5,075,610 A | 12/1991 | Harris | 318/701 |
| 5,119,000 A | 6/1992 | Schultz et al. | 318/254 |
| 5,122,697 A | 6/1992 | Horst | 310/181 |
| 5,124,607 A | 6/1992 | Rieber et al. | 310/214 |
| 5,140,207 A | 8/1992 | Baumeister | 310/83 |
| 5,144,209 A | 9/1992 | Ingji et al. | 318/254 |
| 5,175,458 A | 12/1992 | Lemmer et al. | 310/71 |
| 5,196,775 A | 3/1993 | Harris et al. | 318/638 |
| 5,239,217 A | 8/1993 | Horst | 310/51 |
| 5,239,220 A | 8/1993 | Taji et al. | 310/214 |
| 5,250,867 A | 10/1993 | Gizaw | 310/179 |
| 5,270,603 A | 12/1993 | Narumi | 310/260 |
| 5,294,856 A | 3/1994 | Horst | 310/181 |
| 5,296,785 A | 3/1994 | Miller | 318/254 |
| 5,306,976 A | 4/1994 | Beckman | 310/215 |
| RE34,609 E | 5/1994 | Mueller | 318/254 |
| 5,343,105 A | 8/1994 | Sakabe et al. | 310/179 |
| 5,373,206 A | 12/1994 | Lim | 310/68 |
| 5,386,162 A | 1/1995 | Horst | 310/51 |
| 5,396,137 A * | 3/1995 | Shinto et al. | 310/156.44 |
| 5,446,359 A | 8/1995 | Horst | 318/701 |
| 5,461,295 A | 10/1995 | Horst | 318/701 |
| 5,479,080 A | 12/1995 | Jones et al. | 318/701 |
| 5,487,213 A | 1/1996 | Hult et al. | 29/556 |
| 5,563,488 A | 10/1996 | Stephenson et al. | 318/701 |
| 5,589,752 A | 12/1996 | Iwasaki et al. | 318/701 |
| 5,604,388 A | 2/1997 | Baker et al. | 310/51 |
| 5,670,836 A * | 9/1997 | Horst | 310/156.15 |
| 5,701,064 A | 12/1997 | Horst et al. | 318/701 |
| 5,770,910 A | 6/1998 | Horst | 310/214 |
| 5,801,463 A | 9/1998 | Suzuki et al. | 310/51 |
| 5,844,343 A * | 12/1998 | Horst | 310/168 |
| 5,852,334 A | 12/1998 | Pengov | 310/168 |
| 5,959,373 A * | 9/1999 | Cho | 310/12 |
| 5,986,418 A | 11/1999 | Horst et al. | 318/254 |
| 6,002,184 A * | 12/1999 | Delson et al. | 310/14 |
| RE36,568 E | 2/2000 | Horst | 318/701 |
| 6,025,658 A * | 2/2000 | Kamata | 310/12 |
| 6,028,385 A | 2/2000 | Pengov | 310/166 |
| 6,051,903 A | 4/2000 | Pengov | 310/168 |
| 6,072,260 A | 6/2000 | Randall | 310/216 |
| 6,181,047 B1 * | 1/2001 | Nitta | 310/179 |

OTHER PUBLICATIONS

Electric Motors and Motor Controls; Jeff Keljik; 1995; Delmar Publishers; pp. 9–13.*

English Abstract of Japanese patent application No. 06–086769 published as 07–298669 Nov. 10, 1995.

English Abstract of Japanese Patent JP3089897.

English Abstract of German Patent DE 4036565.

C. Pollock and C. Y. Wu, "Acoustic Noise Cancellation Techniques for Switched Reluctance Drives," *Record of the Industry Applications Conference (IAS)*, Vol 1, pp. 448–455, Orlando, Florida, Oct. 8–12, 1995.

C. Y. Wu and C. Pollock, "Analysis and Reduction of Vibration and Acoustic Noise in the Switched Reluctance Drive," 1993, Proceedings of the IAS '93, pp. 106–113.

C. Y. Wu and C. Pollock, "Analysis and Reduction of Vibration and Acoustic Noise in the Switched Reluctance Drive," *IEEE Transactions on Industry Applications*, vol. 31, No. 1 pp. 91–98, Jan./Feb. 1995.

Charles Pollock and Barry W. Williams, "A Unipolar Converter for a Switched Reluctance Motor," *Conference Record of the 1988 IEEE Industry Applications Society Annual Meeting*, pp. 44–49, Pittsburg, Pennsylvania, Oct. 2–7, 1988.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

F. Blaabjerg et al., "Investigation and Reduction of Acoustical Noise from Switched Reluctance Drives in Current and Voltage Control," Sep. 5–7, 1994, Proc. ICEM '94, pp. 589–594.

Frede Blaabjerg and John K. Pedersen, "Digital Implemented Random Modulation Strategies for AC and Switched Reluctance Drives," Proceedings of the IECON'93, pp. 676–682, International Conference Industrial Conference on Industrial Electronics, Control and Instrumentation, Maui, Hawaii, Nov. 15–19, 1993.

Mehdi Moallem et al., "Effect of Rotor Profiles on the Torque of a Switched–Reluctance Motor", *IEEE Transactions on Industry Applications*, vol. 28, No. 2, Mar./Apr. 1992, ppgs. 364–369.

Richard S. Wallace and David G. Taylor, "A Balanced Commutator for Switched Reluctance Motors to Reduce Torque Ripple," IEEE Transactions on Power Electronics, vol. 7, No. 4, pp. 617–626, Oct. 1992.

Richard S. Wallace and David G. Taylor, "Low–Torque–RippleSwitched Reluctance Motors for Direct–Drive Robotics," *IEEE Transactions on Robotics and Automation*, vol. 7, No. 6, pp. 733–742, Dec. 1991.

Richard S. Wallace, Jr., "Design and Control of Switched Reluctance Motors to Reduce Torque Ripple," Georgia Institute of Technology, Nov. 1990.

S. Chan et al., "Performance Enhancement of Single–Phase Switched–ReluctanceMotor by DC Link Voltage Boosting," Sep. 1993, IEEE Proceedings–B, vol. 140, pp. 316–322.

Shi–Ping Hsu et al., "Modeling and Analysis of Switching DC–to–DC Converters in Constant–Frequency Current––ProgrammedMode," 1979, IEEE Power Electronics Specialists Conference, pp. 284–301.

Stephenson and Blake, "The Characteristics, Design and Applications of Switched Reluctance Motors and Drives," PCIM Conference & Exhibition, Jun. 21–24, 1993, Nuremberg, Germany.

International Search Report for PCT/US01/30441.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

Patent Abstracts of Japan vol. 1999, No. 12, Oct. 29, 1999 and JP 11 178298 A (Toshiba Corp), Jul. 2, 1999 abstract, Figure 8.

* cited by examiner

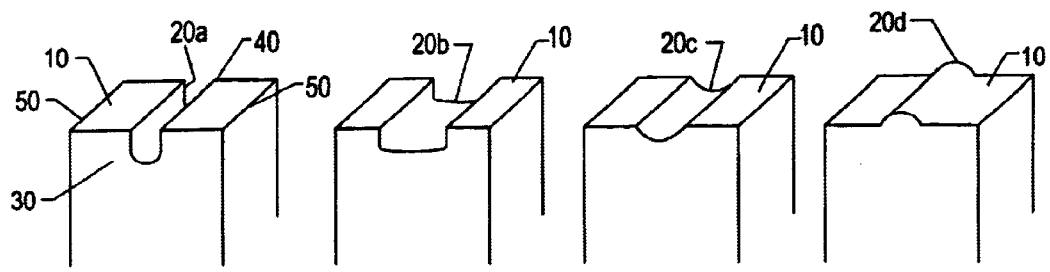
FIG. 9A   FIG. 9B   FIG. 9C   FIG. 9D
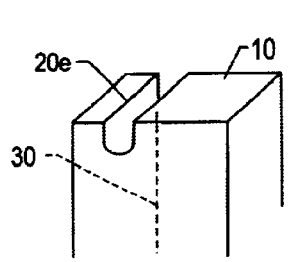 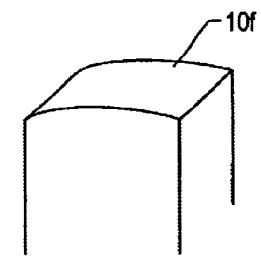
FIG. 9E   FIG. 9F
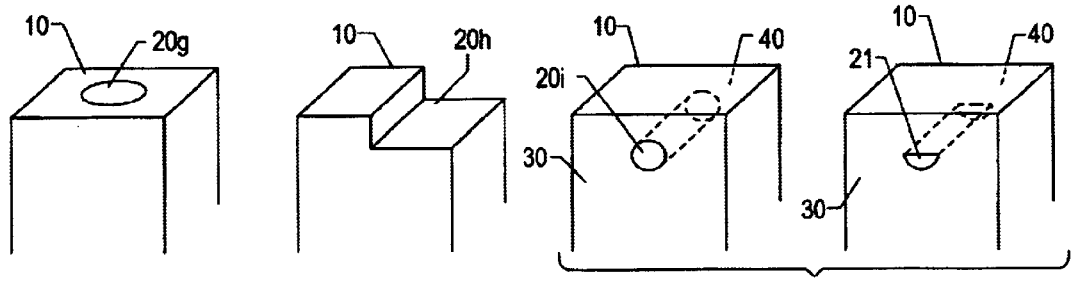
FIG. 9G   FIG. 9H   FIG. 9I
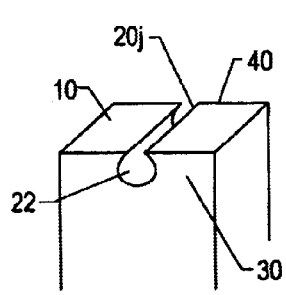 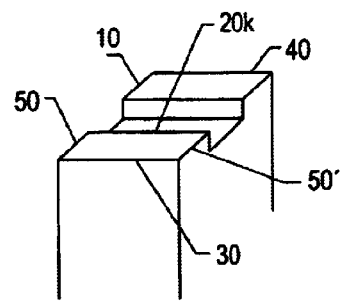
FIG. 9J   FIG. 9K

REDUCED NOISE DYNAMOELECTRIC MACHINE

BACKGROUND OF THE INVENTION

1. Field of the Invention

The present invention relates to dynamoelectric machines, and more particularly to dynamoelectric machines having a characteristic of decreased noise while operating.

2. Relation to Prior Art

Dynamoelectric machines are well known in the art. One such dynamoelectric machine is a reluctance machine. In general, a reluctance machine is an electric machine in which torque is produced by the tendency of a movable part to move to a position where the inductance of an excited winding is maximized (i.e., the reluctance is minimized).

In one type of reluctance machine, the phase windings are energized at a controlled frequency. This type of reluctance machine is generally referred to as a synchronous reluctance machine. In another type of reluctance machine, circuitry is provided to determine or estimate the position of the machine's rotor, and the windings of a phase are energized as a function of rotor position. This type of reluctance machine is generally referred to as a switched reluctance machine. Although the description of the current invention is in the context of a switched reluctance motor, the present invention is applicable to all forms of reluctance machines, including synchronous and switched reluctance motors, reluctance generators, and to other machines that have phase winding arrangements similar to those of switched reluctance machines.

Generally, the stator of a switched reluctance motor includes a ring of inwardly extending stator poles about which are positioned one or more phase windings. The energization of such a phase winding tends to cause the rotor to move into a position where the inductance of an excited winding is maximized. The energization of such a phase winding will also tend to deform the stator by drawing certain stator poles associated with the energized phase winding towards the rotor poles. In general, as a rotor pole comes into alignment with a stator pole, the forces tending to draw the stator pole towards the rotor pole (i.e., the normal forces) will generally begin to increase, will reach a maximum at full alignment, and will decrease thereafter.

FIG. 1A generally illustrates an exemplary rotor pole 1 as it rotates into and then past alignment with a stator pole 3, surrounded by a phase coil 5. The current profile supplied to the stator pole 3 is shown in FIG. 1B. The current profile presented is idealized, and actual currents will have characteristics different from those represented in FIG.1B. Particular apparatus for generating the illustrated currents as a function of the angular position of the rotor is omitted, and the construction of such apparatus will be apparent to one of ordinary skill in the art.

The exemplary current in FIG. 1B supplied to coil 5 surrounding stator pole 1 is shown in relation to the angular position of a rotor pole 1. The current typically involves a ramp increase to energize the stator pole. Then, the current is maintained at a substantially constant level to bring the rotor pole into minimum reluctance relation to the stator pole. Once the rotor pole has aligned with approximately 50 % of the stator pole (corresponding to the position identified by the dashed line in FIGS. 1A–1C), the current undergoes a cutoff, and begins to decrease in accordance with traditional energization schemes. The rotor pole reaches minimum reluctance as it aligns 100% with the stator pole and then passes out of relation to the stator pole.

As the rotor pole 1 moves in relation to stator pole 3, the inductance between the poles changes. The change in inductance produces torque in the rotor, which causes angular displacement of the rotor. The torque has a tangential and normal component due to the magnet flux path that passes through the radially opposed pole pairs, the rotor and the stator. The tangential component will tend to cause the rotor to rotate. The normal component will tend to cause the stator pole to move towards the rotor pole.

FIG. 1C generally illustrates the normal forces exerted on the stator pole as a function of the angular position of the rotor for the illustrated current waveform. As illustrated, the normal forces will begin to increase near the point where the rotor pole begins to overlap the stator pole. In FIG. 1C, the normal force increases as the rotor pole aligns with stator pole until a maximum force is reached at the point where the rotor pole is fully aligned with the stator pole. This point of full alignment also generally corresponds to the minimum reluctance point. The normal force then decreases steadily as the poles pass out of alignment. As illustrated in FIGS. 1A–1C, for traditional reluctance machines energized in the traditional manner, the normal force curve has a continuous, uniform profile for the electrical interaction of the two uniform faced poles as they pass in relation to one another.

The establishment of the normal forces described above tends to result in an "ovalizing" of the stator as normal forces attempt to collapse the air gap between the rotor poles and the stator poles associated with the energized phase winding. These radially opposed normal forces tend to distort the stator yoke from its generally circular configuration and force it out of round. Upon de-energization of the stator poles, the stator returns to its original circular configuration. Even though the deflection during energization is extremely slight, under continuous operation the distortion produces a noticeable whining noise.

Traditional switched reluctance machines have rotor and stator constructions that result in the establishment of normal forces such that each of the stator poles in the machine experiences the same normal forces, although not necessarily at the same point in time.

FIGS. 2A–2B generally and schematically illustrate the types of "deflection modes" that are established in reluctance machines having two and four normal forces acting on the stator. As used herein, the number of deflection modes that a reluctance machine may have corresponds to the number of localized areas where normal forces are generated in the machine during energization of one of the machine's phase windings. Typically, the number of deflection modes for a given machine will correspond to the number of stator poles encircled by each phase winding in the machine. Although the present discussion describes reluctance machines with 2 and 4-modes of deflection, it is to be understood that additional modes exist beyond those depicted. Furthermore, 3-mode deflection (i.e. odd-mode deflection) cannot occur in an electromagnetically balanced motor.

Referring to FIGS. 2A–2B, the identified figures include arrows 8 representing the normal forces acting on the stator poles associated with an exemplary energized phase winding at a specific point in time. As noted in the Figures, the normal forces 8 acting on the various stator poles associated with the given energized phase winding are, at each point in time, substantially equal.

In FIG. 2A, the equal and opposite normal forces 8 tend to ovalize the stator 6. This represents a two-mode deflection since there are two localized areas where normal forces 8 are generated during energization of phase A windings. Also, FIG. 2B represents a four-mode deflection since there are four localized areas where normal forces 8 are generated during energization of phase A windings. Higher ordered modes of deflection are also possible beyond four modes.

In addition to establishing normal forces that are equal with respect to an energization of a given phase winding, traditional reluctance machines are constructed so that the normal forces established by the energization of another phase winding are the same in profile (although physically displaced) as the normal forces established upon energization of the given or another phase at a later point in time. In other words, in typical reluctance machines, the normal forces that are exerted on the stator poles associated with the energization of a phase winding at one time are the same as the normal forces associated with the energization of that phase winding at all other times and—in magnitude although not necessarily in alignment—with the forces associated with the energization of all other phase windings.

To better illustrate the distribution of equal normal forces around a stator during phase energizations, FIGS. 3A and 3B are presented. FIG. 3A shows a reluctance machine 10 having eight stator poles, four rotor poles 22 and two phase windings A and B. FIG. 3A also illustrates the normal forces 14 established upon energization of a first phase winding A at an initial time. As may be noted, because the phase winding energized at this time surrounds four stator poles, there are four points where the deflection forces are substantially localized on the stator. As such, the machine of FIG. 3A has four deflection modes.

FIG. 3B illustrates the condition of the machine at a point in time later than that illustrated in FIG. 3A. Only the second of the phase windings B of the machine is energized. Because the second phase winding surrounds four stator poles, as with energization of the first phase winding, there are four points where the deflection forces 14' are substantially localized on the stator. The forces 14' developed at the four deflection points are substantially identical to those forces 14 developed during energization of the first phase winding A, although they are located at differing physical points on the stator. Due to the distortions resulting from such a distribution of normal forces about the stator during subsequent phase energizations, many switched reluctance motors have noise spikes at the commutation frequency and harmonics thereof.

One proposed solution in the prior art for reducing the noise produced by a reluctance machine includes increasing the number of stator modes. For example, the stator/rotor combination of 6/4 can be doubled to a 12/8 combination that provides four-mode deflection of the stator. The increase in modes, however, undesirably reduces the power density of the motor. It also requires the use of rotor and stator laminations with a large number of poles that may result in increased material or manufacturing costs.

Another proposed solution in the prior art to reduce noise involves controlling the energization currents applied to the phase windings in an effort to shape the normal forces established in the machine. Such "tuning" of the energization currents is often sensitive to the application to which the motor is applied.

Another solution in the prior art to reduce noise involves stiffening the stator yoke. A more robust stator yoke attempts to limit deflection caused by the normal forces and thereby reduces the noise spike. Unfortunately, adding material to the yoke increases weight and cost to the switched reluctance motor while producing diminished gains in performance.

Yet another solution in the prior art to reduce noise involves the use of wide and narrow rotor poles. In this solution, a first set of opposed rotor poles is provided with a narrow width, while a second set of opposed rotor poles is much wider. The ratio of widths for the wide to narrow poles may be as great as 2:1. The solution is detailed in U.S. Pat. Nos. 5,582,334; 6,028,385 and 6,051,903 to Pengov. The solution attempts to limit the deflections of the stator by offsetting a first set of radial forces by a second set of radial forces that are 90° therefrom. In other words, during the first half of the phase energization a 2-mode deflection acts on the stator. This 2-mode deflection acts to stiffen or resist the subsequent deflection of the quadrature stator poles which are fluxed in the second half of the phase current.

There are several disadvantages to the above approach. First, the solution requires that, due to the wide rotor poles, attractive forces on the stator poles for a first phase need to be maintained while attractive forces 6 on the stator are initiated for a second phase. Thus, significant attraction is required between the wide rotor poles with energized stator poles after the poles have passed 50% alignment. As a result, overly adverse normal forces and corresponding deflections occur when the wide rotor poles completely overlaps the energized stator poles.

Second, the use of wide poles as in Pengov creates a situation where a positive change in inductance with respect to a change in angular orientation $$\left(\frac{dL}{d\theta}\right)$$

does not occurs on all poles for a given phase energization. To illustrate the case where a positive $$\left(\frac{dL}{d\theta}\right)$$

does not occur for a given phase energization, FIGS. 4A–4D are presented.

The 8/4 reluctance machine 10 of FIG. 4A has wide rotor poles a and c and narrow rotor poles b and d. There are 8 stator poles, but focus will be on stator poles A, B, C and D corresponding to a single phase. The narrow rotor poles b and d have a width for their face that is substantially similar to that of the stator poles. As the current in FIG. 4B energizes the phase windings, the rotor moves relative to the stator.

FIGS. 4C and 4D show the inductance in the stator poles as a function of the angular orientation of the corresponding rotor poles. FIG. 4C depicts the change in inductance for stator poles A and C as the wide rotor poles a and c pass in relation. There is a point as the wide rotor poles pass in relation to the stator poles where the slope $$\left(\frac{dL}{d\theta}\right)$$

is not changing (i.e. the slope of the curve is essentially zero).

FIG. 4C depicts the change in inductance for stator poles B and D as the narrow rotor poles b and d pass in relation. In contrast to wide rotor poles passing in relation to the stator poles, the stator poles B and D experience a positive $$\left(\frac{dL}{d\theta}\right)$$

as they are energized and the narrow, like-sized rotor poles b and d pass in relation.

Another disadvantage of the Pengov solution relates to the magnetic flux paths that are used in the above solution. Long flux paths around the stator characterize the magnetic flux for the reluctance machine according to the Pengov solution to reduce noise in a reluctance machine. FIGS. 4E–F depict a reluctance machine having alternating wide and narrow rotor poles according to the Pengov solution. Phase A is shown energized so that magnetic flux lines pass through the energized stator poles, the rotor and the stator yoke.

FIG. 4E shows a reluctance machine having alternating wide and narrow rotor poles during the first 50% alignment of the rotor with the energized stator poles. The polarities of the four energized stator poles provides that each stator pole of one polarity (i.e. S) is adjacent to a stator pole of the same phase with the same polarity (S) and also adjacent to a stator pole of the same phase having an opposite polarity (N). In other words, stator pole 12 is an S-pole. Adjacent pole 12' is also S-pole, while adjacent pole 14' is N-pole. This is referred to as a NNSS orientation of the polarities.

There are essentially two, long pole paths that the flux travels in this first 50% portion of alignment. The first path has three, long flux paths 20 which pass from stator pole 12 with S-polarity, through the wide rotor poles, to stator pole 14 with N-polarity, and around the stator yoke. Thus, three long flux paths 20 traverse the side 1 of the stator yoke. Likewise, a second path has three, long flux paths 20' which pass from stator pole 12 with S-polarity, through the wide rotor poles, to stator pole 14 with N-polarity, and around the stator yoke. Because the narrow rotor poles have not reached relation with stator poles 12' and 14', no flux travels by way of these stator poles.

FIG. 4F shows the reluctance after the rotor has surpassed 50% alignment with the energized stator poles. Due to the arrangement of the polarities for the radially opposed pairs of stator poles, the flux lines take both short and long paths after 50% alignment. Short flux paths 22 and 22' have three flux lines and pass around stator poles 12 and 14. Long flux paths 20 and 20' have two flux lines each and pass around stator poles 12' and 14'.

As a result, portions 1 and 1' of the stator yoke accommodate 2 flux lines, while portions 2 and 2' accommodate 1 flux line. The flux paths can over saturate the inductance capacity of portions of the stator yoke and thus decrease the efficiency of the reluctance machine.

In contrast, a conventional reluctance machine, as depicted in FIG. 4G, has all coil sides contributing to useful flux by facilitating short flux paths around the stator and through the rotor. The polarization of a conventional reluctance machine sets stator pole 10 to a N-pole. The adjacent pole of the same phase, pole 12 is polarized to an S-pole, as is the other adjacent pole of the same phase 14. This is referred to as a NSNS orientation of the polarities and facilitates short magnetic flux paths. The orientation presents a more efficient arrangement of flux paths.

As indicated above, existing techniques for reducing noise in switched reluctance machines typically are ineffective on a large-scale basis, costly to implement, or adversely impact the performance of the motor. The present invention provides an improved, low-noise reluctance machine that does not suffer from the drawback described above, and other drawbacks associated with such existing techniques.

SUMMARY OF THE INVENTION

In accordance with one aspect of the present invention, there is provided a linear electromagnetic machine a movable member and a stationary member. The stationary member defines at least one stationary pole. A phase winding is positioned such that, when current is flowing in the phase winding, the at least one stationary pole is energized. Also provided is a circuit for energizing the phase winding over a plurality of energization cycles to produce a given force tending to cause linear movement of the movable member with respect to the stationary member. The energizing of the phase winding also produces a normal force tending to cause movement of the movable and stationary members in a direction normal to the desired linear movement. The normal force profile experienced by the at least one stationary pole over a first energization cycle is different from the normal force profile experienced by the at least one pole stationary over a subsequent energization cycle.

In accordance with one aspect of the present invention, there is provided an electromagnetic machine. The electromagnetic machine includes a rotor defining a plurality of rotor poles. Each rotor pole has a pole face defining an angular width. The angular width of the rotor pole with the widest width is: (a) substantially equal to or greater than the angular width of the rotor pole with the narrowest width, and (b) less than 1.5 times the angular width of the rotor pole with the narrowest width. The electromagnetic machine includes a stator defining at least two stator poles that are radially opposed to one another. There is provided a phase winding positioned such that, when current is flowing in the phase winding, the at least two stator poles are energized. There is also provided a circuit for energizing the phase winding over a plurality of energization cycles to produce a given desired output on the rotor. The energizing of the phase winding also produces a normal force tending to cause movement of the at least two stator poles towards the rotor. The normal force profile experienced by the at least two stator poles over a first energization cycle is different from the normal force profile experienced by the at least two stator poles over a subsequent energization cycle.

In accordance with one aspect of the present invention, there in provided an electromagnetic machine including a rotor defining a plurality of rotor poles. Each rotor pole has a pole face defining an angular width. The angular widths of each of the rotor poles are substantially the same. The electromagnetic machine also includes a stator defining a first set of opposing stator poles and a second set of opposing stator poles. Each of the stator poles is associated with at least one current carrying member such that a stator pole is energized when current is flowing through a current carrying member associated with the stator pole. The electromagnetic machine also includes a circuit for energizing the at least one current carrying member over a given interval so as to simultaneously energize the first and second sets of opposing stator poles. The energizing of the current carrying member also produces normal forces tending to cause movement of the energized stator poles towards the rotor. The normal force profile experienced by the first pair of opposing stator poles over the given interval is substantially different from the normal force profile experienced by the second pair of opposing stator poles over the given interval.

Other aspects and advantages of the present invention will become apparent upon reading the following detailed description and upon reference to the drawings.

BRIEF DESCRIPTION OF THE DRAWINGS

The foregoing and other features and aspects of the subject invention will be best understood with reference to a detailed description of specific embodiments of the invention, which follow, when read in conjunction with the accompanying drawings, in which.

occurs during the interaction of rotor and stator poles.

Figure 4A:
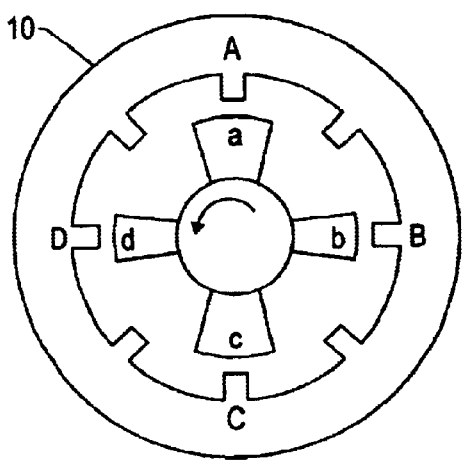
FIGS. 4A–4D detail where a positive $$\left(\frac{dL}{d\theta}\right)$$
Figure 4B:
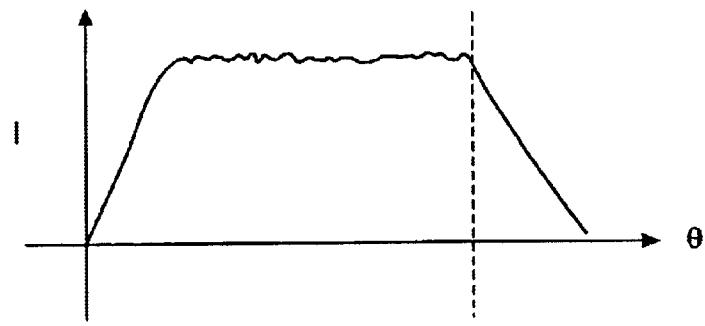
Figure 4C:
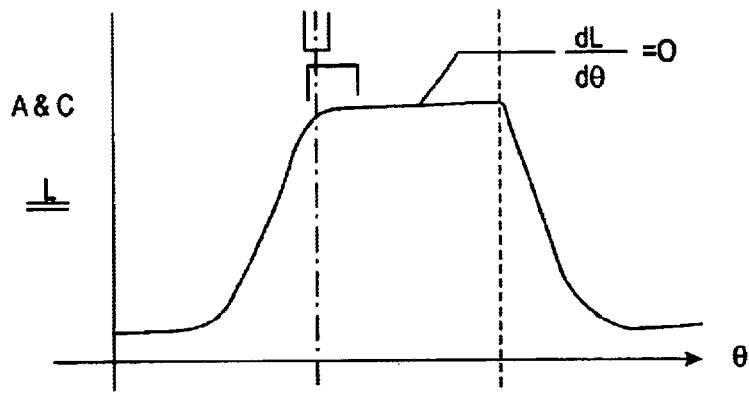
Figure 4D:
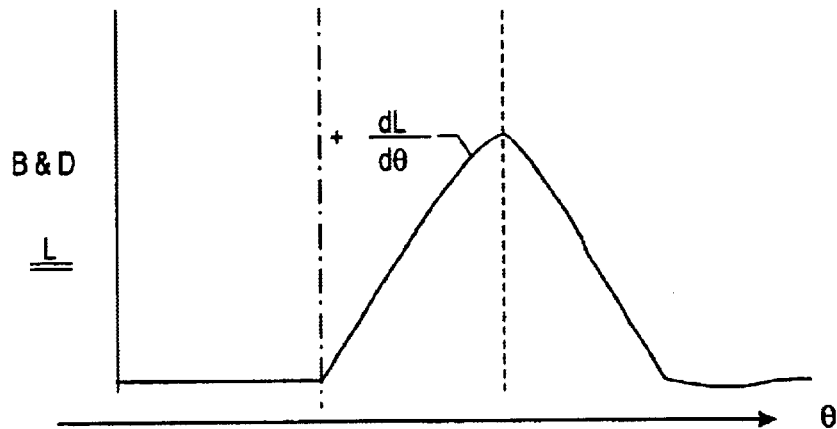
Figure 4E:
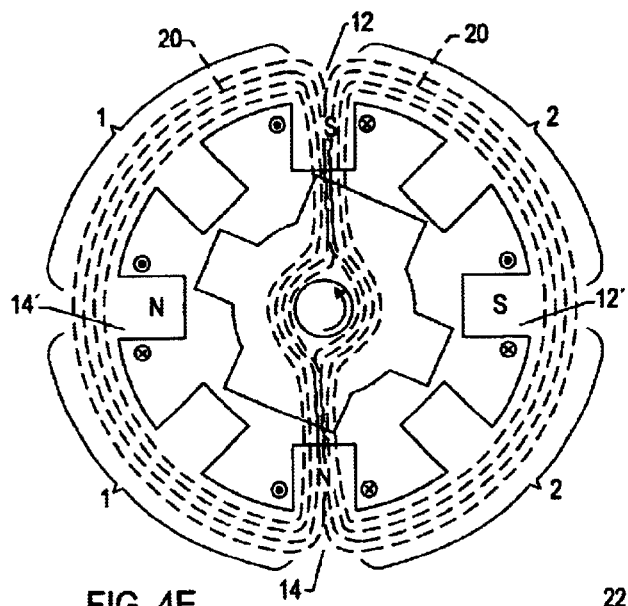
Figure 4F:
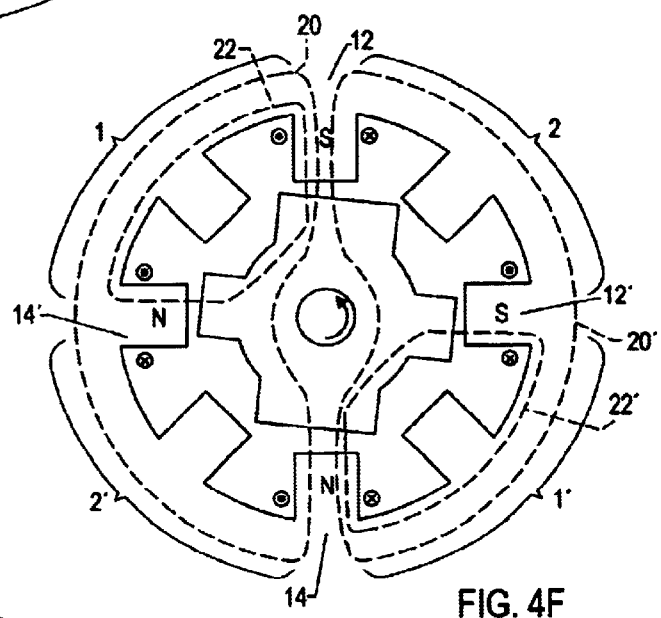

FIGS. 4E–F show the flux paths for a reluctance machine having wide and narrow rotor poles according to a solution in the prior art.

Figure 4G:
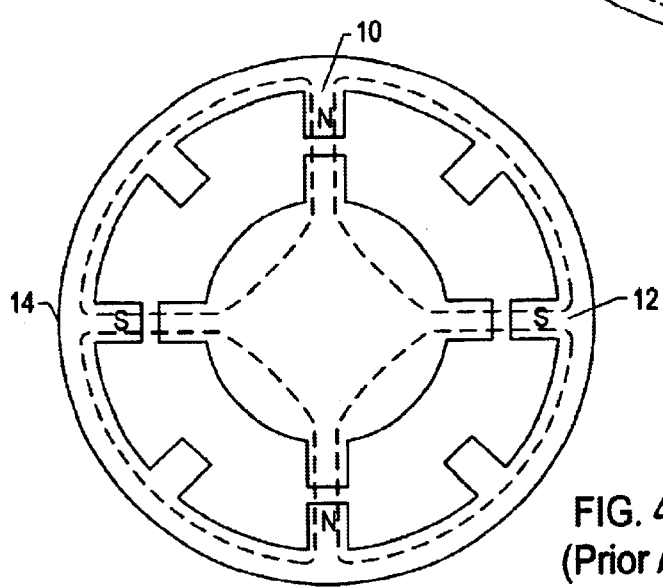

FIG. 4G shows the flux paths for a conventional reluctance machine.

Figure 5A:
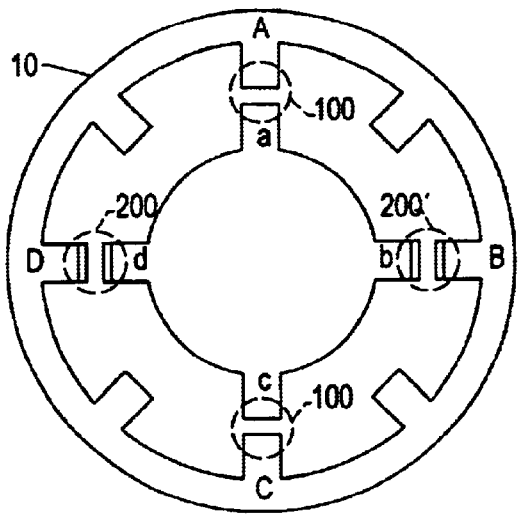

FIG. 5A depicts a reluctance machine having interactions with differing normal forces that occur on the stator poles during a given phase energization.

Figure 5B:
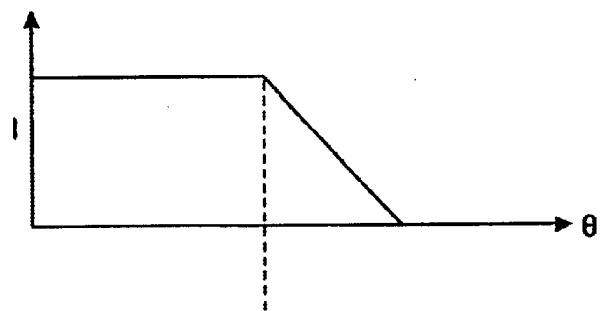

FIG. 5B shows the current supplied to stator poles of the machine in FIG. 5A.

Figure 5C:
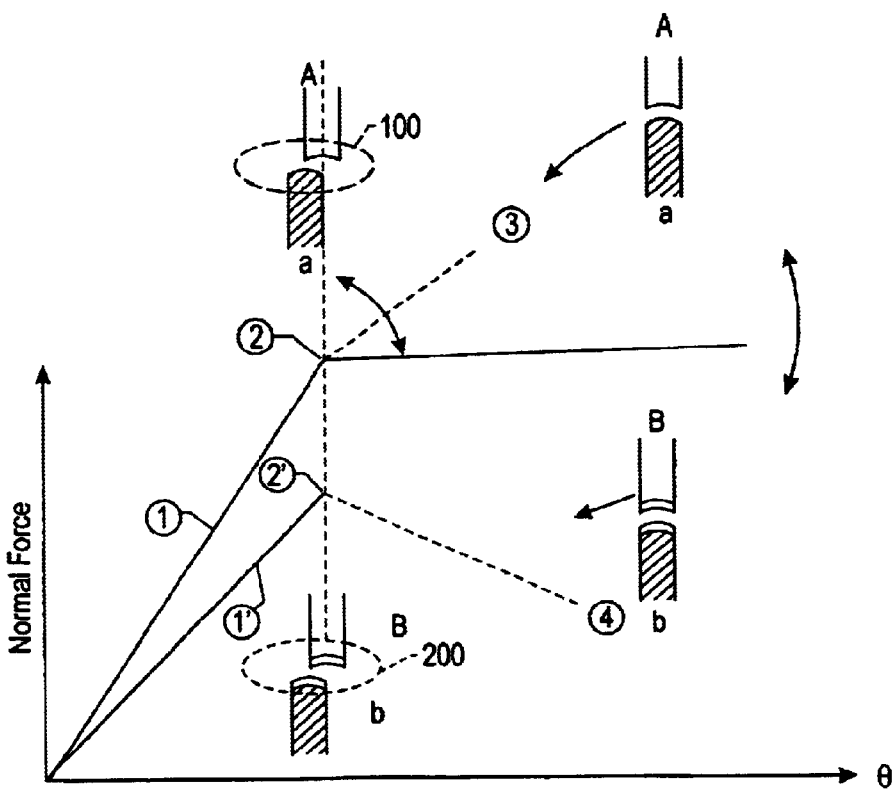

FIG. 5C depicts resulting normal force profiles between stator and respective rotor poles of FIG. 5A.

FIGS. 6A–6D show truncated series of energizations for a reluctance machine with two phases.

Figure 7A:
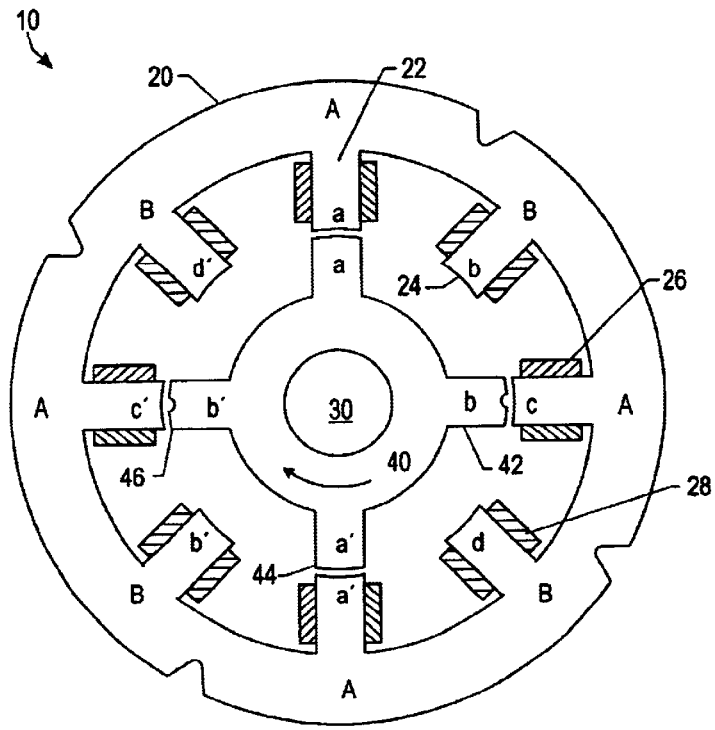
Figure 7B:
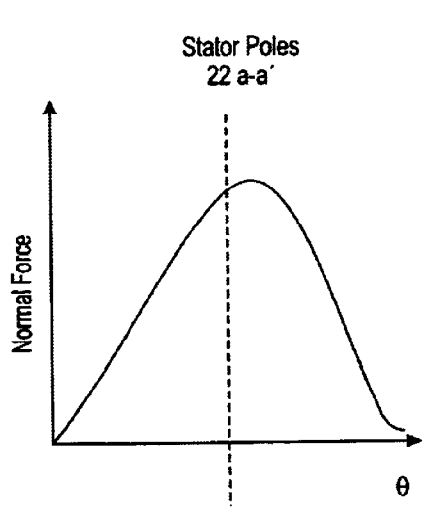
Figure 7C:
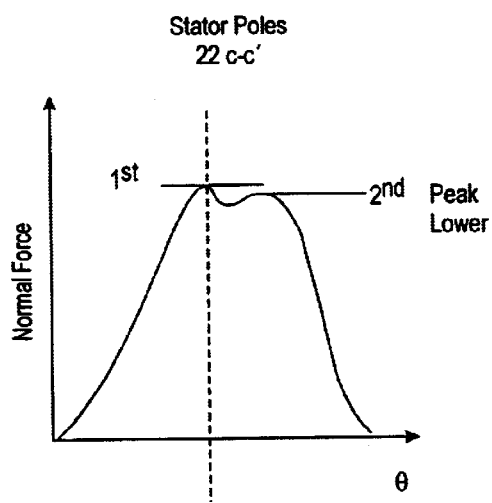

FIGS. 7A–7C shows a sectional view of a two-phase, four mode, reluctance motor having differing normal forces distributed around the stator.

Figure 8A:
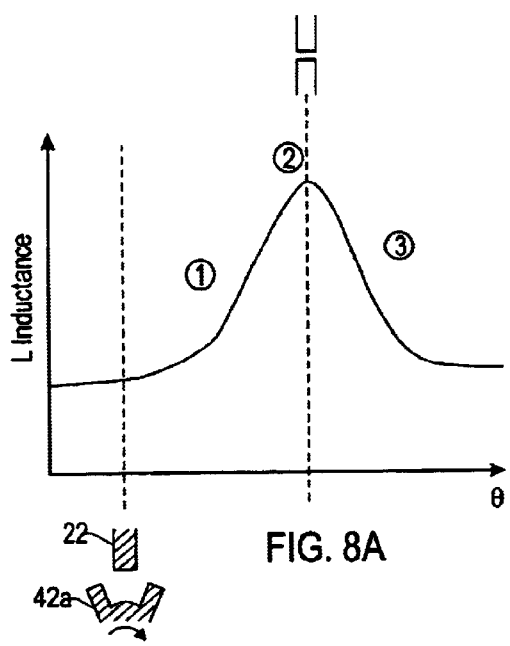
Figure 8B:
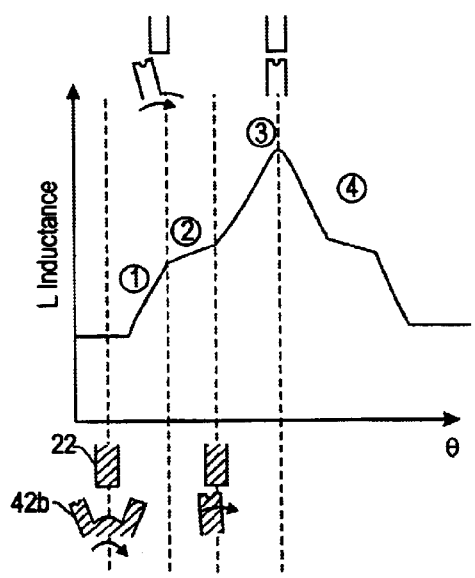
Figure 8C:
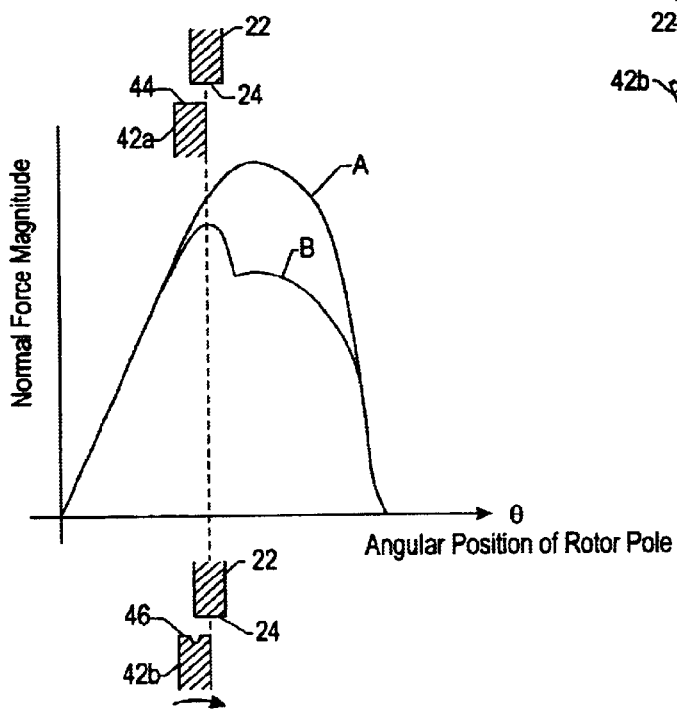

FIGS. 8A–8C depict the conventional and modified interactions of rotor poles with stator poles.

FIGS. 9A–K illustrate alternate embodiments of modified rotor and stator poles in accordance with the present invention.

Figure 9L:
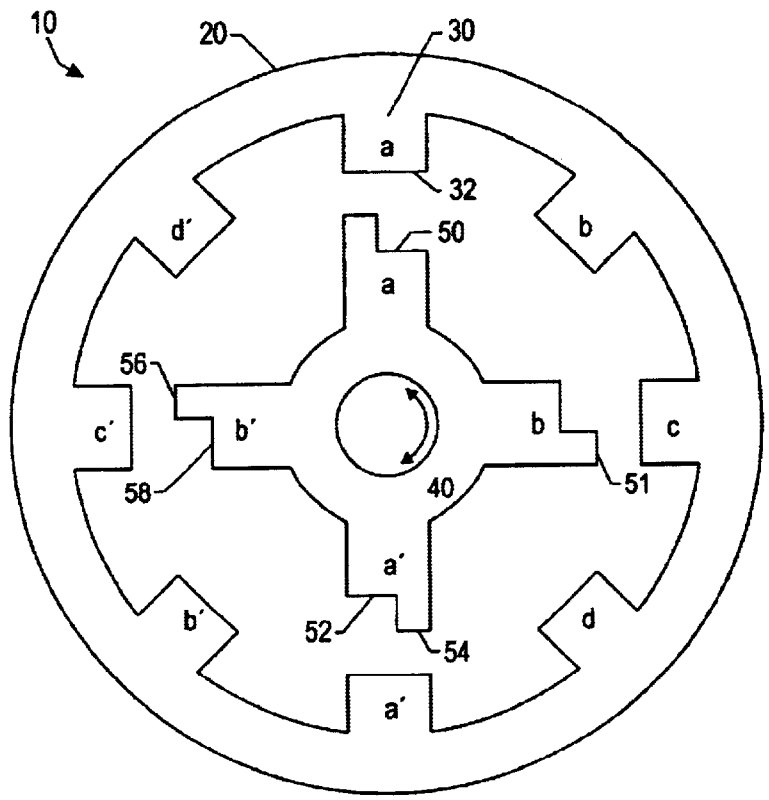

FIG. 9L illustrates an 8/4-reluctance machine having rotor poles as embodied in FIG. 9H.

Figure 10:
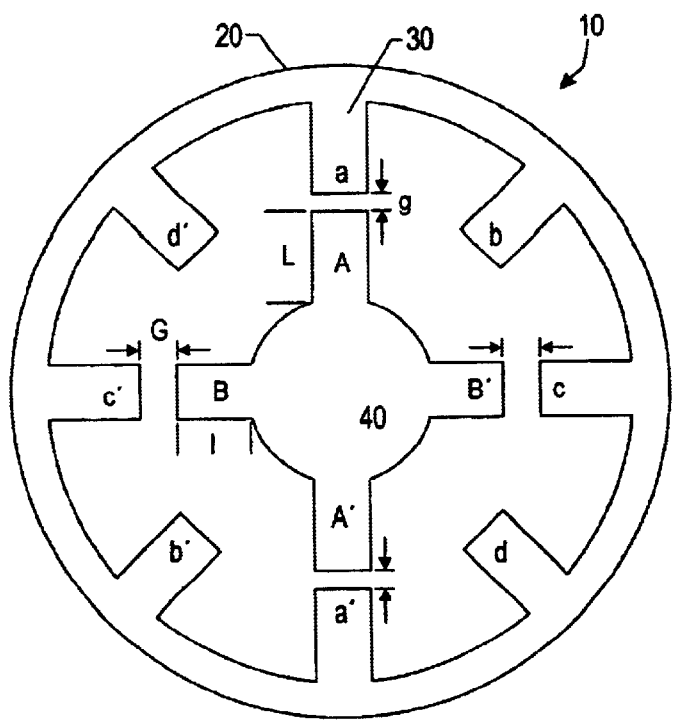

FIG. 10 shows an exemplary rotor where the length of the rotor poles is different at various points so as to present differing air gaps to the stator poles.

Figure 11A:
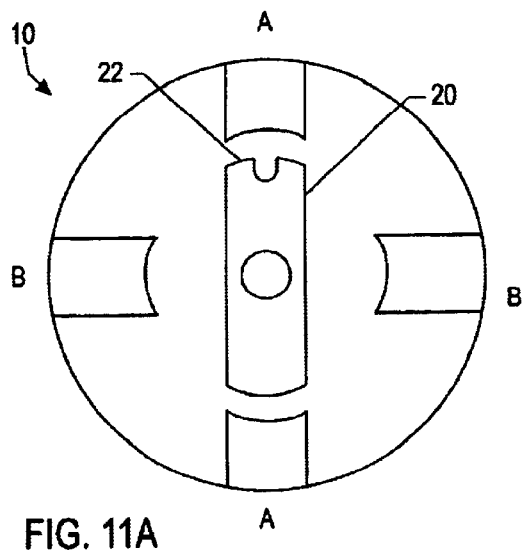
Figure 11B:
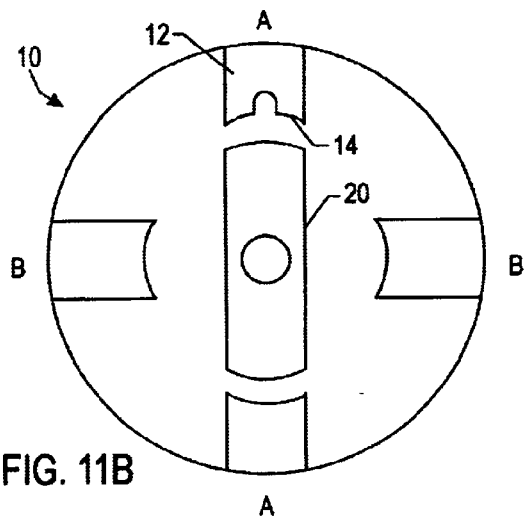
Figure 11C:
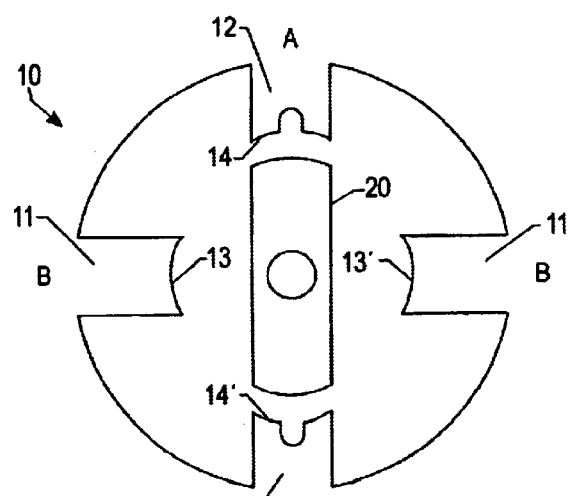

FIGS. 11A–C illustrate the particularly advantageous use of modification of the stator in two mode reluctance machine systems.

Figure 11D:
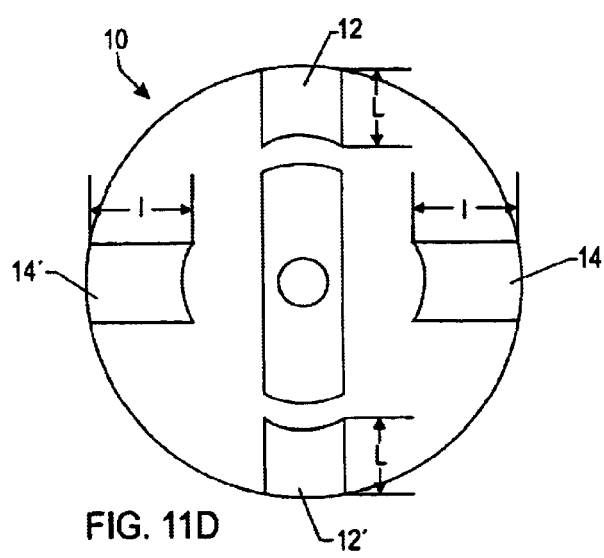

FIG. 11D shows a simplified arrangement of a 4/2-reluctance machine with dissimilar stator pole lengths.

Figure 12A:
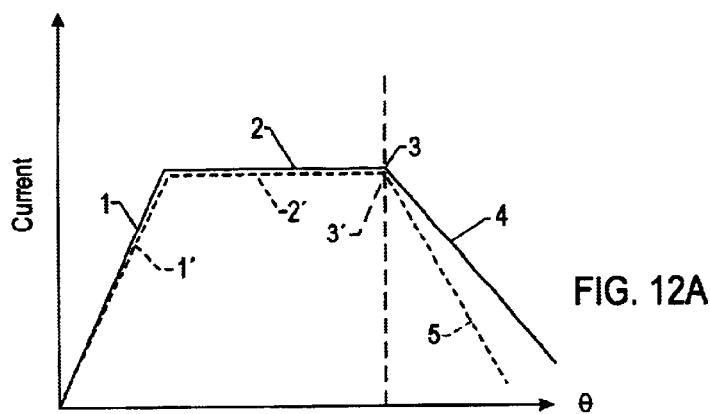

FIG. 12A illustrates dissimilar current profiles with independent phase legs.

Figure 12B:
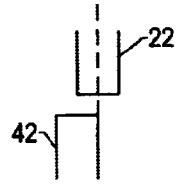
Figure 12B:
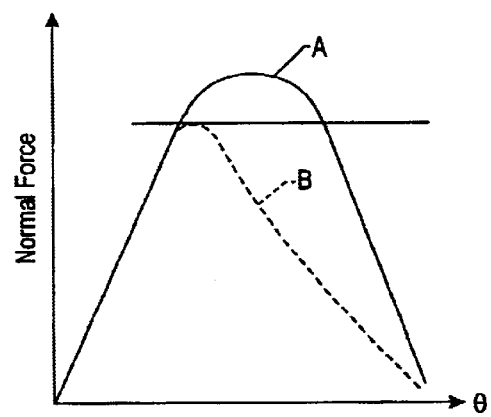

FIG. 12B depicts two possible normal force profiles resulting from dissimilar current profiles supplied to a stator pole at subsequent energizations.

Figure 12C:
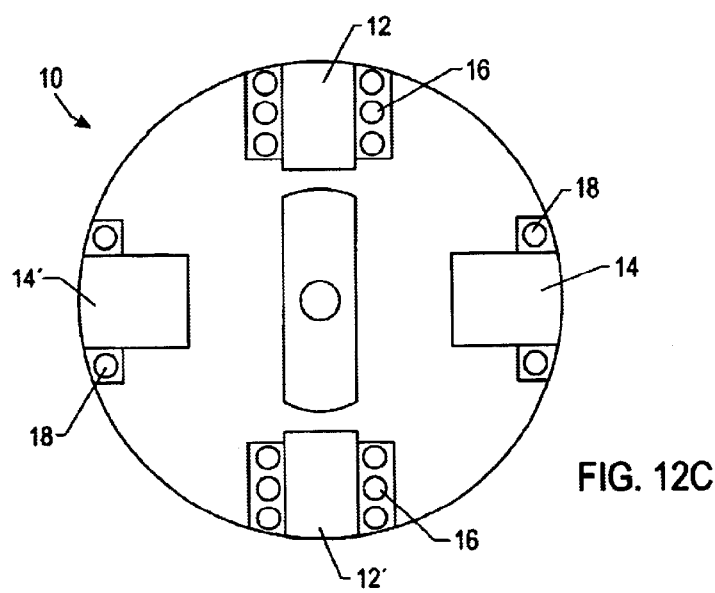

FIG. 12C shows a simplified arrangement of a 4/2-reluctance machine with dissimilar phase windings.

Figure 13:
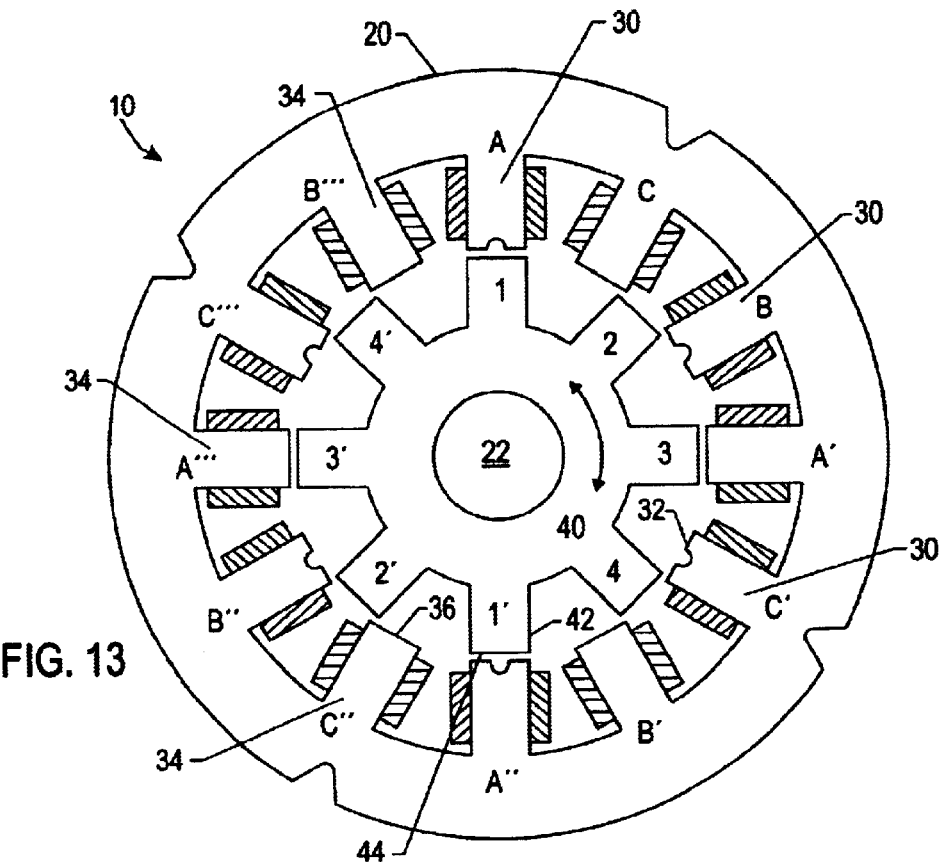

FIG. 13 illustrates an embodiment in accordance with the present invention where one set of stator poles is provided with notched faces.

Figure 14:
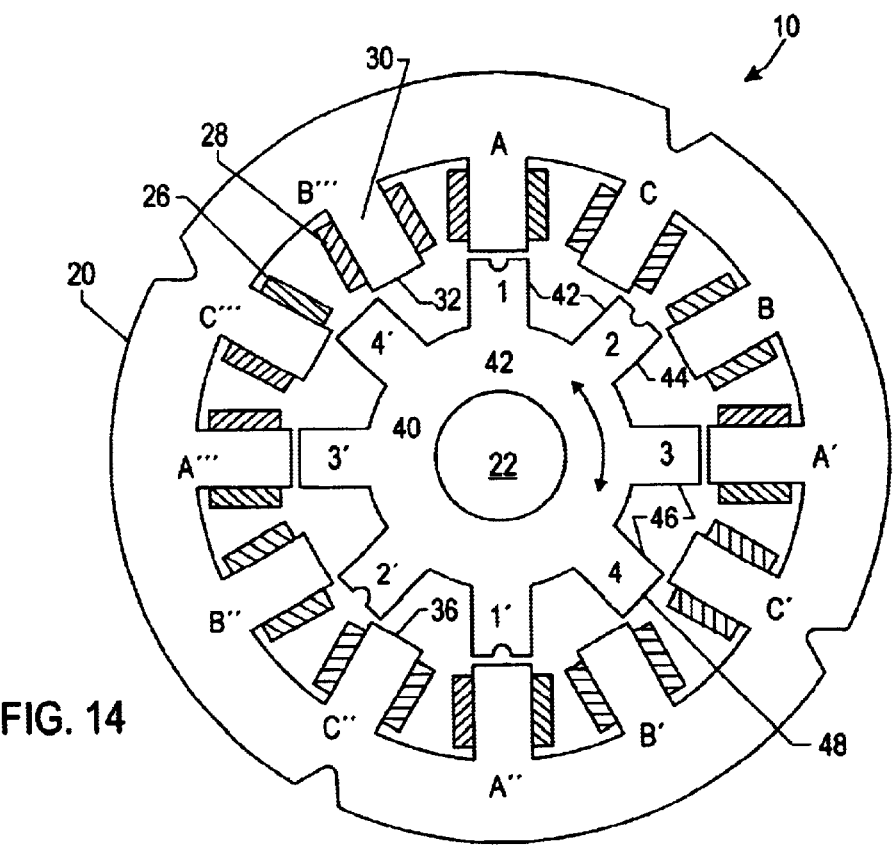

FIG. 14 illustrates an embodiment in accordance with the present invention where one set of rotor poles is provided with notched faces.

Figure 15:
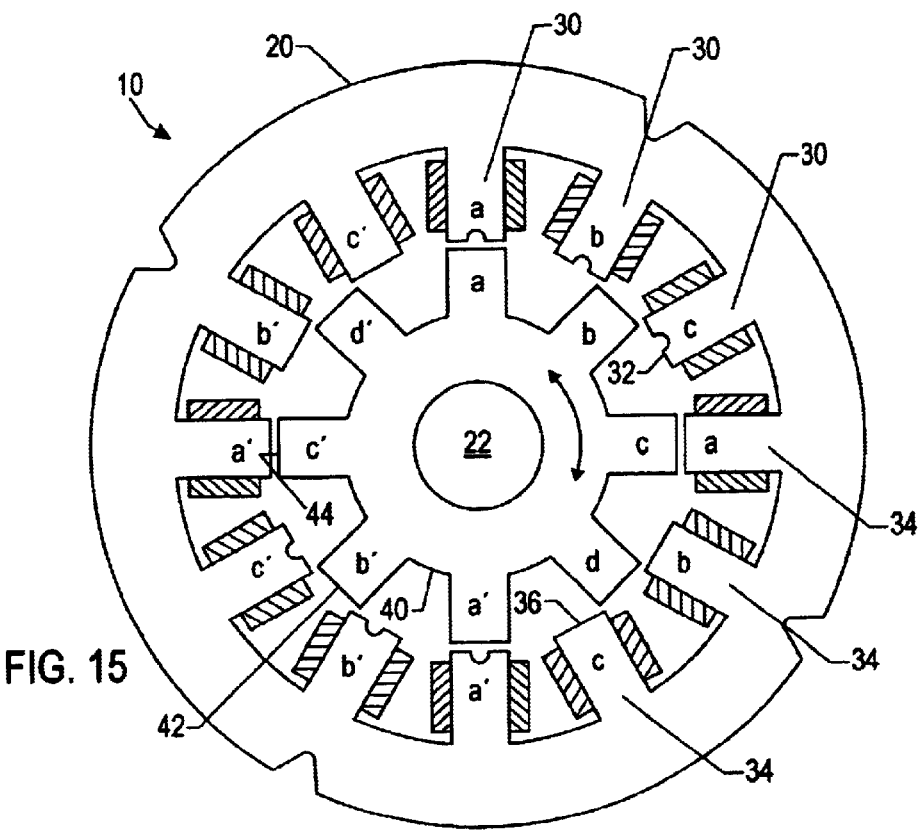

FIG. 15 illustrates an embodiment in accordance with the present invention where a set of multiple stator poles is provided with notched faces.

Figure 16:
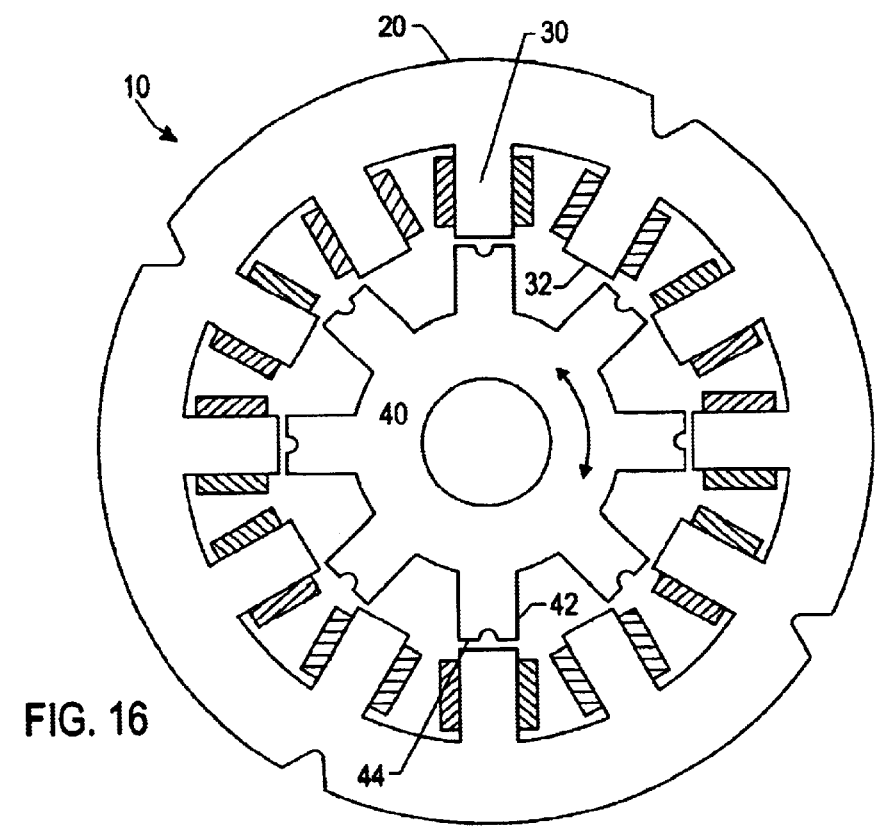

FIG. 16 illustrates an embodiment in accordance with the present invention where all rotor poles are provided with notched faces.

Figure 17:
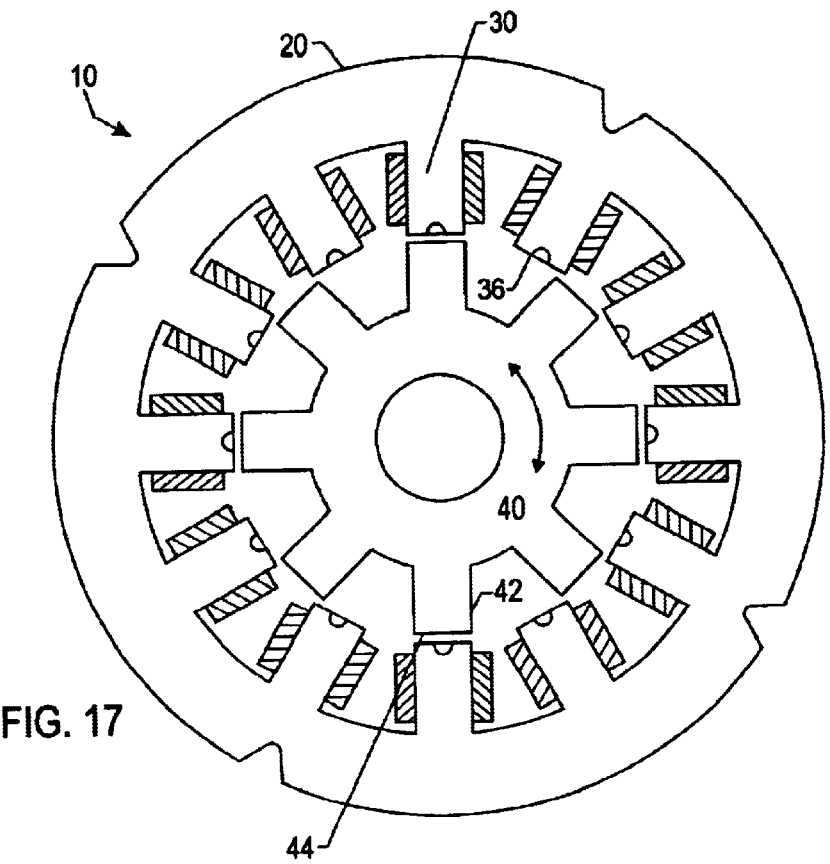

FIG. 17 illustrates an embodiment in accordance with the present invention where all stator poles are provided with notched faces.

Figure 18:
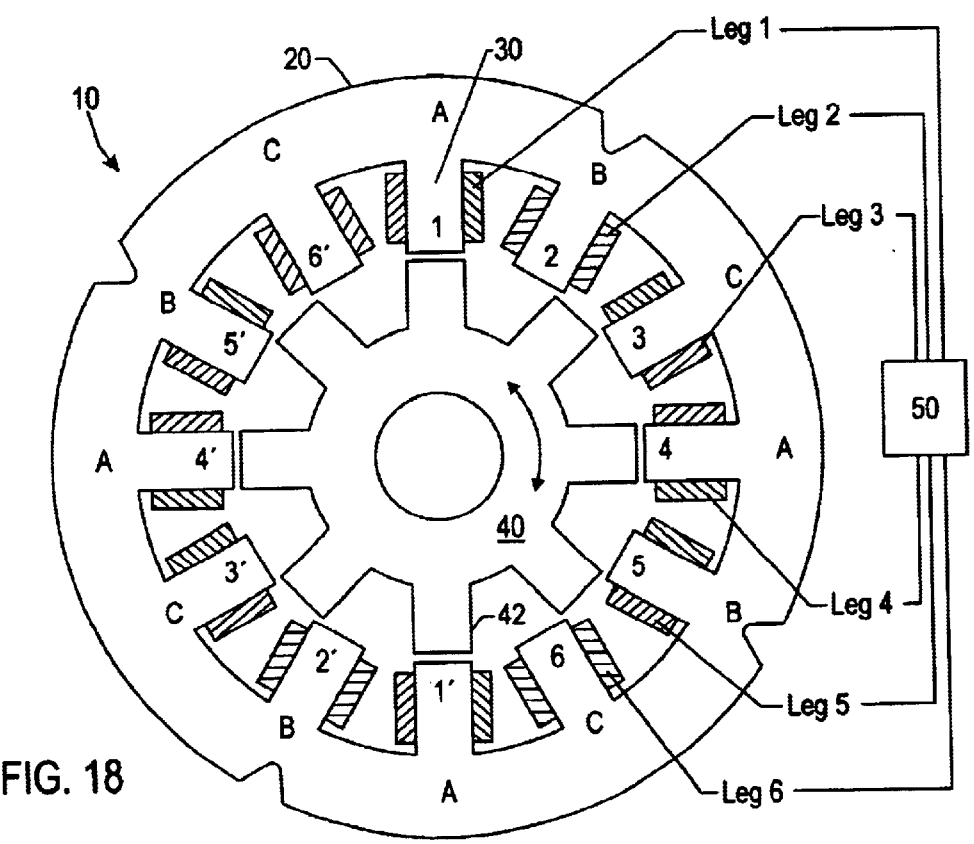

FIG. 18 illustrates an embodiment in accordance with the present invention where independent phase legs are supplied to the stator pole windings.

Figure 19:
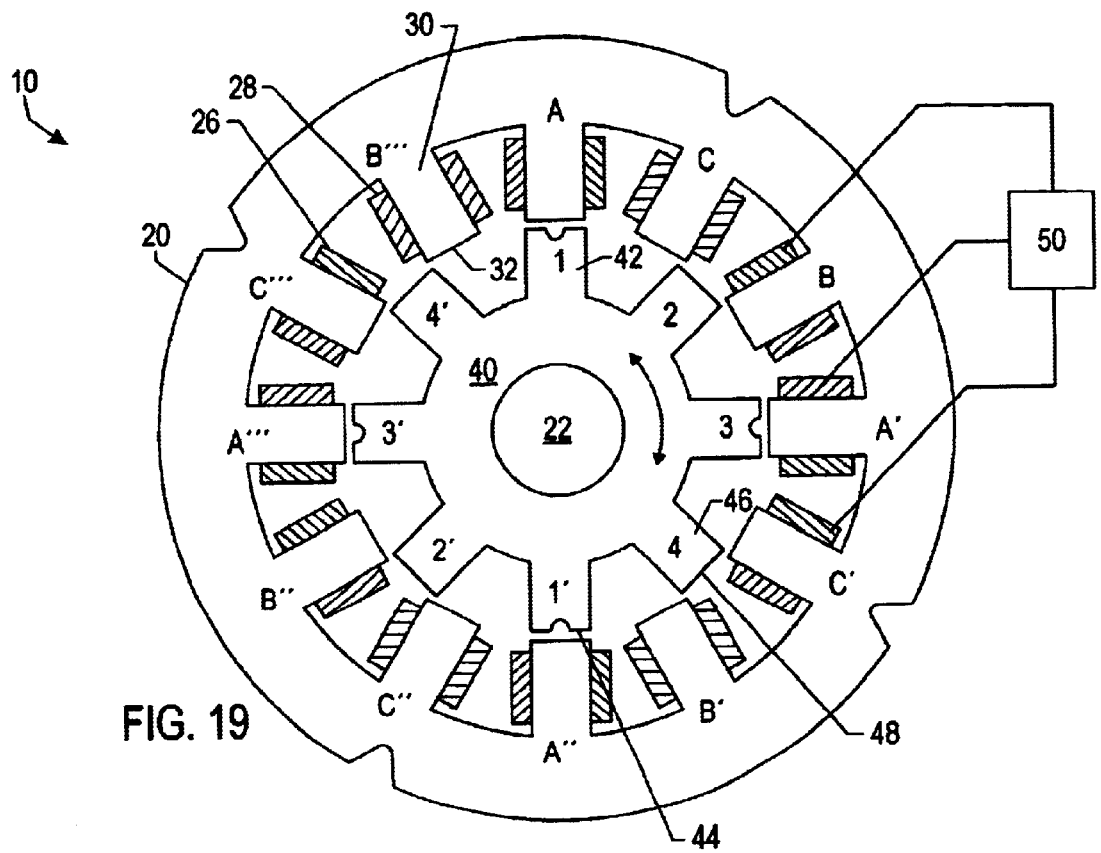

FIG. 19 illustrates a 3 phase, 12/8-reluctance machine in accordance with the present invention.

Figure 20:
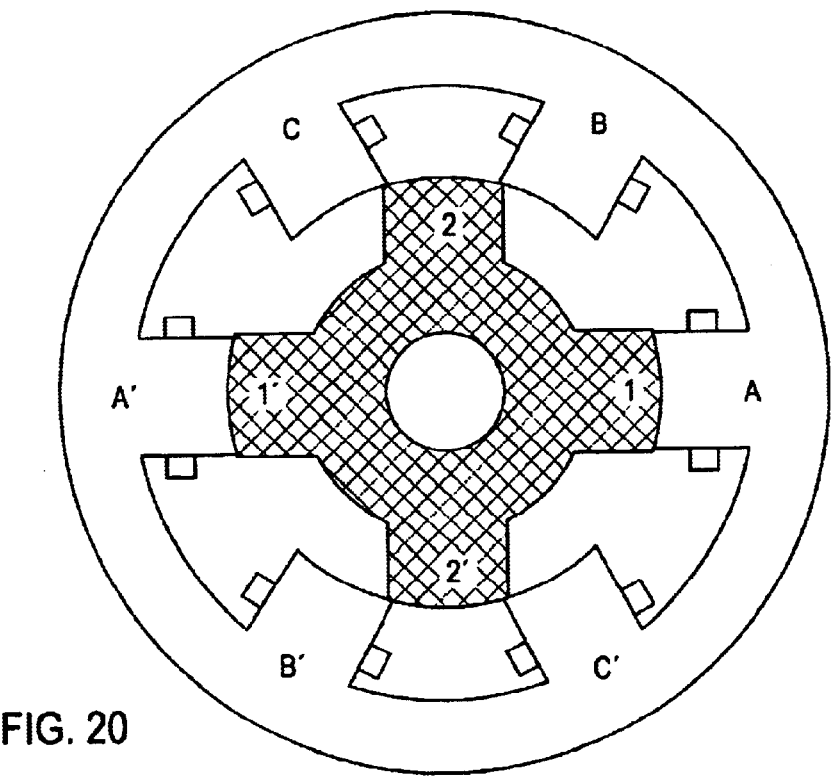

FIG. 20 illustrates a 3-phase, 6/4-reluctance machine in accordance with the present invention.

FIGS. 21A–L illustrate exemplary embodiments of rotors according to the present invention.

Figure 22A:
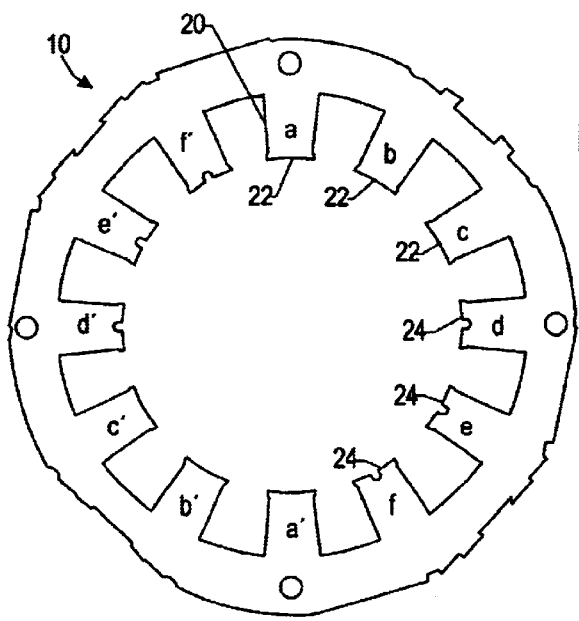
Figure 22B:
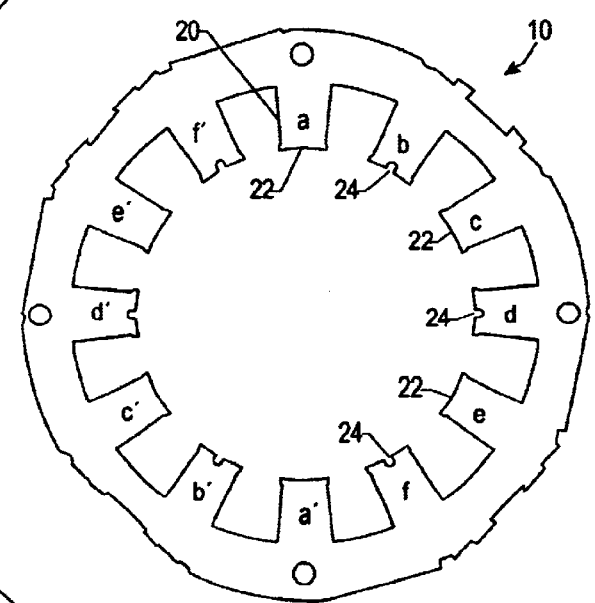
Figure 22C:
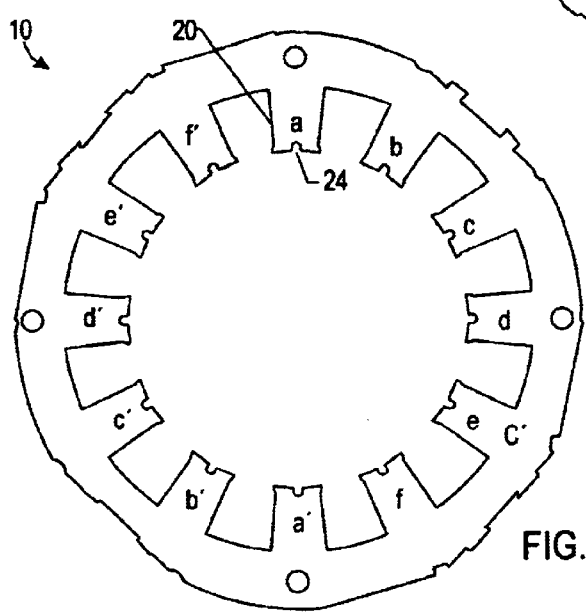

FIGS. 22A–C illustrate exemplary embodiments of stators according to the present invention.

Figure 23A:
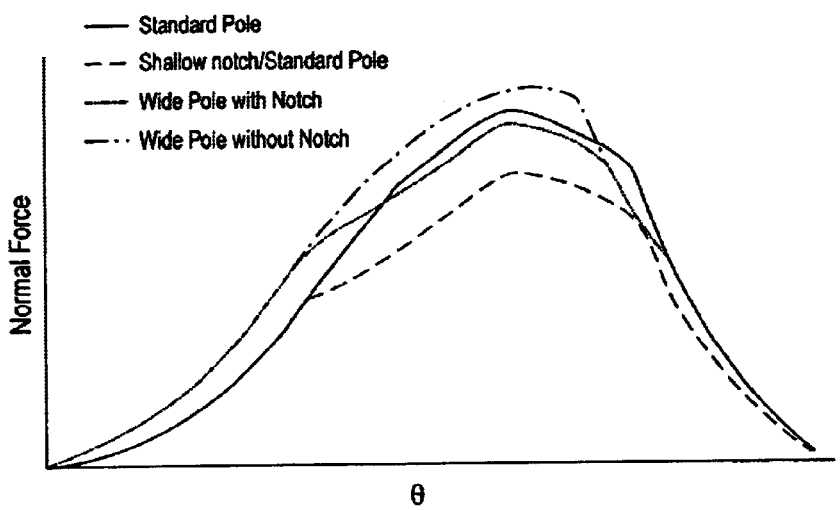

FIG. 23A illustrates four different normal force profiles that occur with the use of narrow and wide poles having standard or modified faces.

Figure 23B:
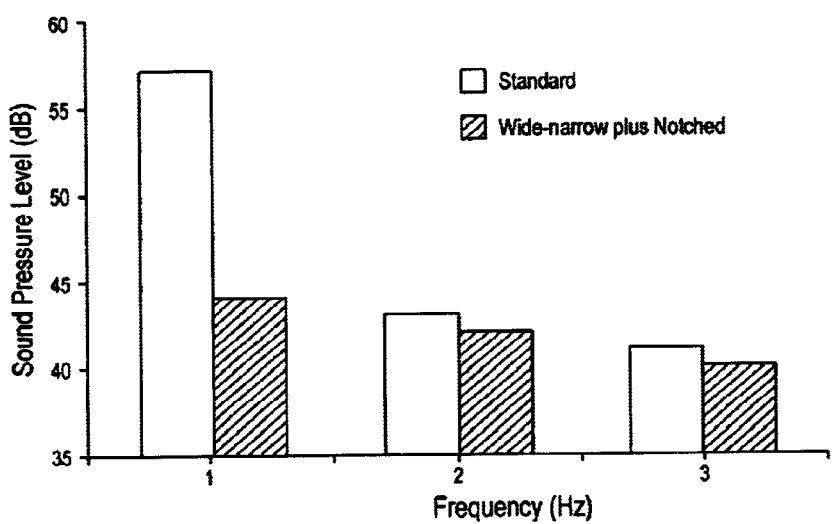

FIGS. 23B and C show exemplary experimental results of the sound pressure level produced in a range of frequencies for different pole arrangements according to the present invention.

Figure 24:
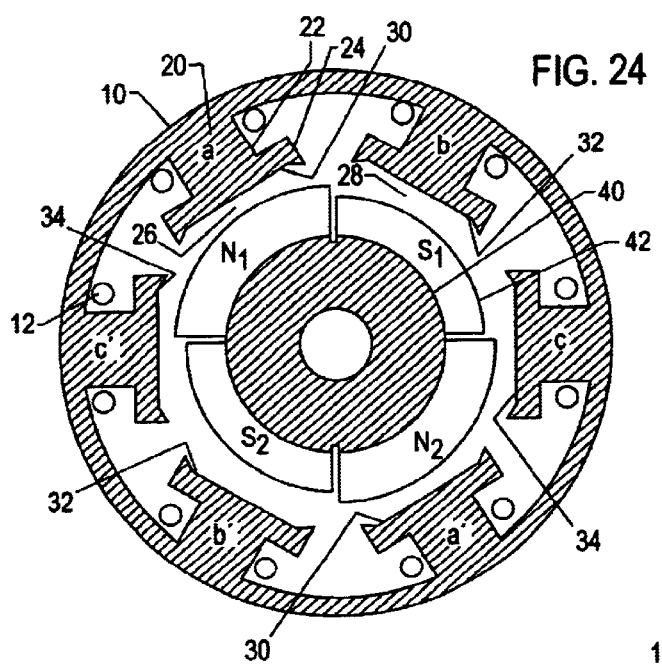

FIG. 24 shows a cross-sectional view of a permanent magnet electric machine according to the present invention.

Figure 25:
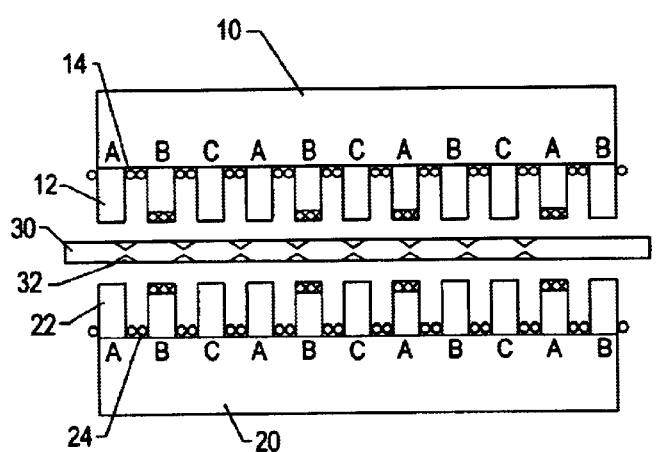

FIG. 25 shows a cross-sectional side view of a linear induction machine according to the present invention.

Figure 26:
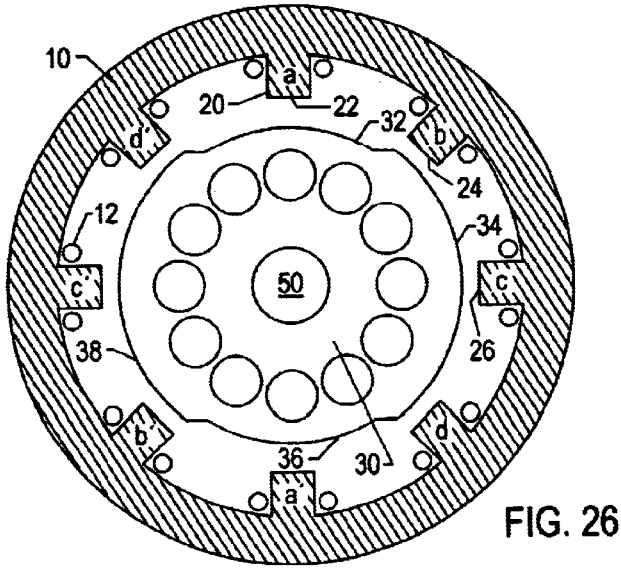

FIG. 26 shows a cross-sectional view of a conventional induction machine according to the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE INVENTION

In the disclosure that follows and in the interest of clarity, not all the features for actual implementation are described. In the actual implementation, numerous decisions must be made to achieve the specific goals. Such a development effort might be complex and time-consuming, but would nevertheless be a routine undertaking for those of ordinary skill in the relevant fields.

It has been discovered by the present inventor that noise in a reluctance machine can be reduced by altering the normal forces established during operation of the motor such that the stator poles experience differing normal forces. It has further been discovered that this noise reduction may be beneficially obtained by ensuring that the modes are rendered out of phase for a certain period of time near the point where the maximum deflection of the rotor would tend to occur (i.e., near the point when the stator poles and rotor poles reach minimum reluctance).

First, noise reduction may be established by controlling the construction and/or energization of the machine such that—for the energization of a given stator winding over a given time—one or more of the stator poles energized by the given stator winding experiences normal forces that are different from those experienced by other stator poles.

Second, noise reduction may be established by controlling the construction and/or energization of the machine such that some or all of the stator poles energized by a first phase winding energized at a first given point in time experience normal forces that are different from some or all of the normal forces experienced by the stator poles energized by a phase winding energized at a second point in time.

To better describe the differing normal forces that can occur on the stator poles during a given phase energization, a 8/4-reluctance machine 10 is depicted in FIG. 5A. The stator poles of interest for the present discussion are poles A, B, C and D, representing stator poles of a single phase. A four-pole rotor 20 is disposed within the stator for rotation therein. A phase is energized and rotor poles a, b, c and d are brought in relation to energized stator poles A, B, C and D respectively. The interactions of 100 and 100' are conventional, as occurs in a typical reluctance machine. The electrical interaction 200 of energized stator pole B with rotor pole b and the interaction 200' of energized stator pole D with rotor pole d both involve a modification of the normal force according to the present invention.

As current is supplied to stator poles A, B, C and D to energize them, the resulting normal force between the stator and respective rotor poles is depicted in FIG. 5B. As previously described, the normal force results from the electrical interaction of the rotor poles passing in relation to the energized stator poles. As a constant current is supplied to the stator poles, the rotor poles are brought in relation to the energized stator poles, and the normal forces increase 1 and 1'. When the rotor poles reach 50% alignment with the stator poles 2 and 2', the current is cut off to the phase windings. Because the interactions for energized stator poles occurs with like-sized rotor poles—that is to say that there is not a substantial ratio of wide to narrow pole widths in the present arrangement, the current is cutoff at a point when a positive change in $$\left(\frac{dL}{d\theta}\right)$$

still occurs for all poles associated with an energized phase.

As the poles reach 100% alignment, conventional interactions 100 and 100' of a stator pole with a rotor pole follows an increasing normal force profile 3 after cut off of the current. Interaction 100 of stator pole A with rotor pole a as shown in FIG. 5A follows this increasing profile, as does interaction 100' of stator pole C with rotor pole c. In contrast, altered interaction 200 of stator pole B with rotor pole b as shown in FIG. 5A follows a decreasing profile 4, as the poles pass beyond 50% alignment. Likewise, altered interaction 200' of stator pole D with rotor pole d as shown in FIG. 5A also follows this decreasing profile 4.

As the machine continues to operate, a desired output is reached. Although the individual torque produced for any given interaction for any given phase may differ from the torque produced by a different interaction, the desired output can be described as the resulting or averaged output of all of the pole interactions for all of the phases for a period of time.

As seen in FIGS. 5A–C above, differing normal forces can occur at the same time on different stator poles during a given phase energization. A unique distribution of the deflections results around the stator at that given time due to differing normal force profiles on the poles. The unique distribution of deflections of the stator can then be produced at any other given time in a series of subsequent energizations. Therefore, the deflections of the stator can be changed at a given time to reduce the noise produced by a reluctance machine.

Also important to the present discussion, a normal force can occur on a stator pole during a subsequent energization that is different than a normal force occurring at an earlier energization. The deflection at that stator pole then changes over time. Applying the changes to various stator poles around the stator results in deflections of the stator that change dynamically over time.

To help illustrate this discussion, FIGS. 6A–D show a truncated series of energizations or energization cycles for an 8/4-reluctance machine with two phases. The use of the 8/4-reluctance machine is for simplicity in description. The present description applies to more complex reluctance machines and additional phase configurations.

Figure 6A:
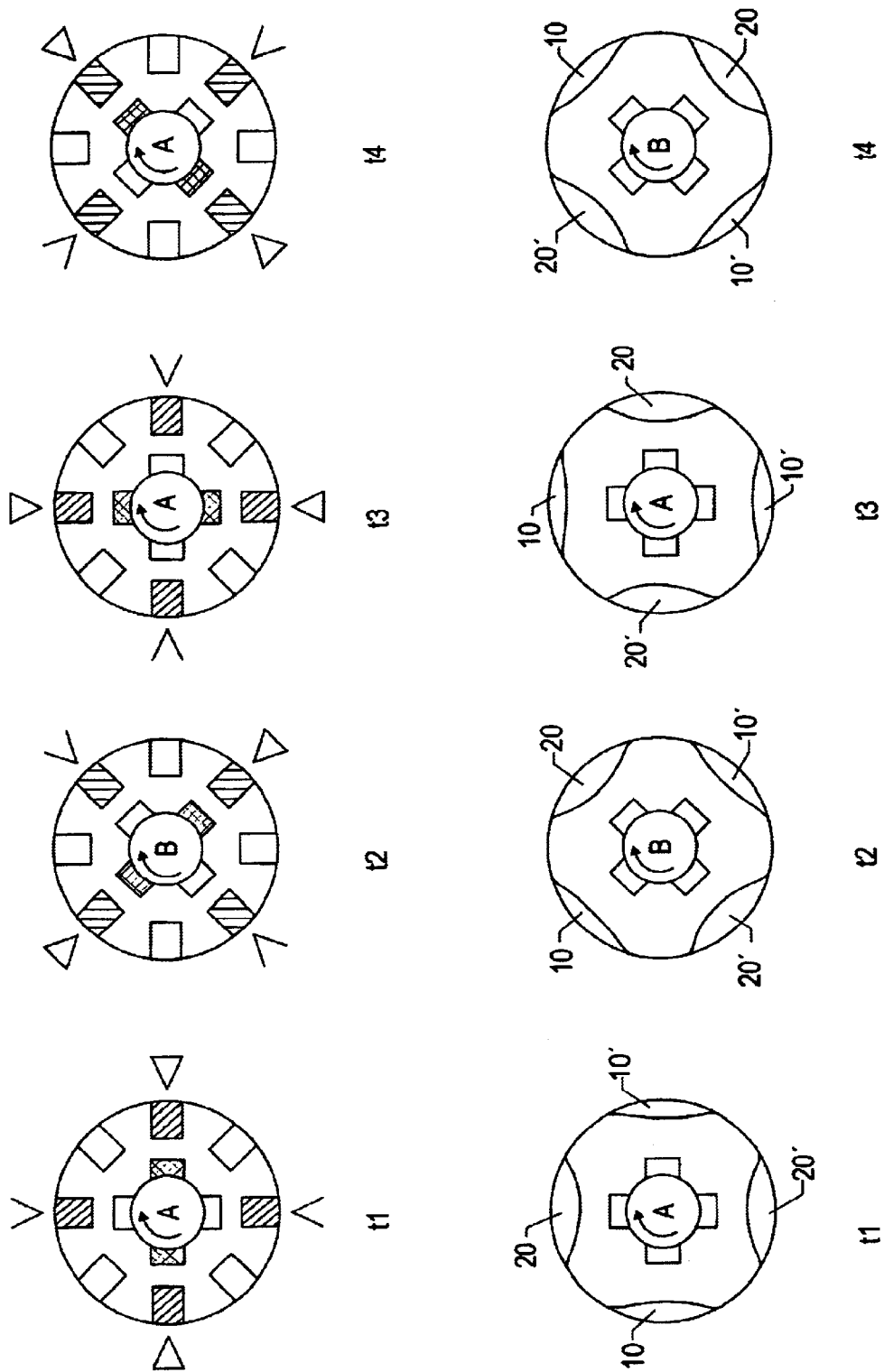

FIG. 6A gives a truncated series of four energizations occurring at times t1, t2, t3 and t4. The series can be extended on indefinitely. At t1, phase A is energized so that the four stator poles with hatch lines are energized. The rotor is shown disposed within the stator poles and has four rotor poles. Two of the rotor poles are modified according to the present invention and are presented as darkened poles.

The modified rotor poles produce a different normal force profile as discussed previously than that of the conventional rotor poles. The resulting normal force profiles for the interaction of the modified rotor poles with respective energized stator poles are shown as the radially opposed "Δ's" around the stator. Similarly, the different normal force profiles for the interaction of the unmodified rotor poles with respective energized stator poles are shown as the radially opposed "V's" around the stator.

The deflections caused by the disparate normal forces on the yoke are presented in the second series below in FIG. 6A. A simplified representation of the deflections caused by the forces is shown. Deflections 10 and 10' result from the normal forces of the radially opposed "Δ's". Deflection 20 and 20' result from the normal forces of the radially opposed "V's". The deflections are shown as differing in magnitude and are exaggerated to illustrate the overall state of the stator yoke. In the present and forgoing discussions, it is to be understood that the deflections as depicted are simplifications of a more complex natural phenomenon. Additionally, it is to be understood that the deflections may not differ only in magnitude, but involve additional features not readily presented in the present Figures. The deflections of the stator will be further understood in later discussions when details of the normal forces and interactions of stator poles with rotor poles are presented in more detail.

With the subsequent energization at time t2, the rotor has been displaced, and phase B is energized. The differing normal forces Δ and V shift in location around the stator. With the subsequent energization at time t3, t4 and so on, the rotor continues to rotate as the phases A and B are energized in succession. The differing normal forces shift accordingly around the stator so that the deflections of the stator change dynamically in time. As a result, the noise produced by vibration of the stator is reduced in comparison to that of conventional reluctance machines that have substantially equal and similar normal forces acting on all the poles of a given phase during a given energization.

Figure 6B:
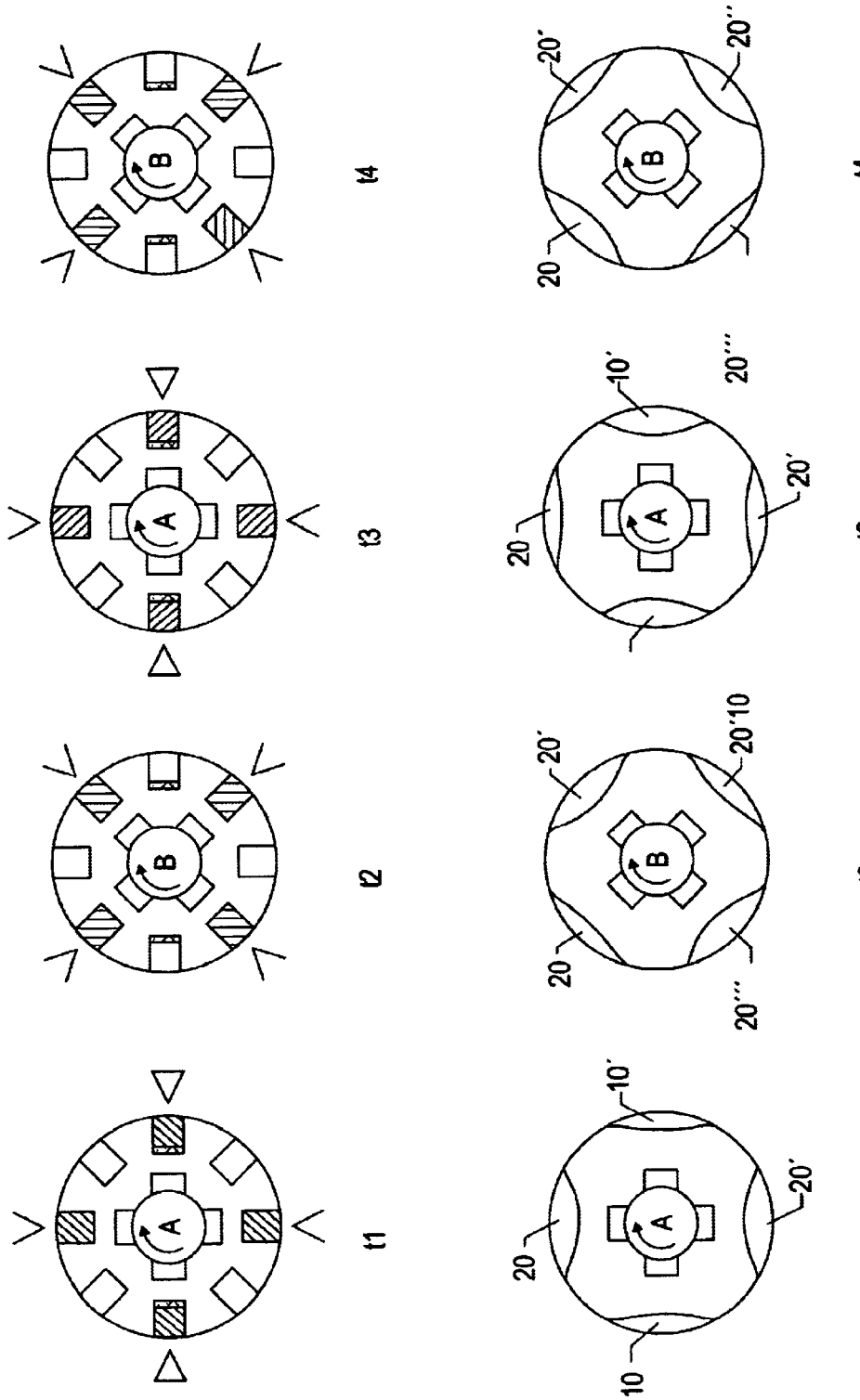

FIG. 6B also gives a truncated series of four energizations occurring at times t1, t2, t3 and t4. The series can be extended on indefinitely. At t1, phase A is energized so that the four stator poles with hatch lines are energized. The rotor is shown disposed within the stator poles and has four rotor poles. Two of the stator poles are modified according to the present invention and are presented with darkened pole ends to differentiate them from the other two stator poles.

The modified stator poles produce a different normal force profile as discussed previously than that of the other stator poles. The resulting normal force profiles for the interaction of the modified stator poles with respective rotor poles are shown as the radially opposed "Δ's" around the stator. Similarly, the resulting normal force profiles for the interaction of the unmodified stator poles with respective rotor poles are shown as the radially opposed "V's" around the stator. Deflections 10 and 10' result from the normal forces of the radially opposed "Δ's". Deflection 20 and 20' result from the normal forces of the radially opposed "V's".

With the subsequent energization at time t2, the rotor has been displaced, and phase B is energized. The distribution of normal forces around the stator involves interactions of unmodified stator poles with rotor poles. Therefore, all of the force symbols are "V's" in shifted location around the stator. All of the deflections at time t2 are substantially equal and are shown below as 20, 20', 20'' and 20'''. With the subsequent energization at time t3, the rotor continues to rotate as the phases A is energized. The differing normal forces occur again as before at time t1. The deflections also resemble the configuration depicted at t1.

With energization at t4, the distribution of the forces resembles that of t2, where all of the normal forces are substantially similar. All of the deflections are substantially similar. As a result, the deflections of the stator change at a given time in the series of energizations. As a result the noise produced is less than conventional reluctance machines that have substantially equal and similar normal forces acting on all the poles of a given phase during successive energizations.

Figure 6C:
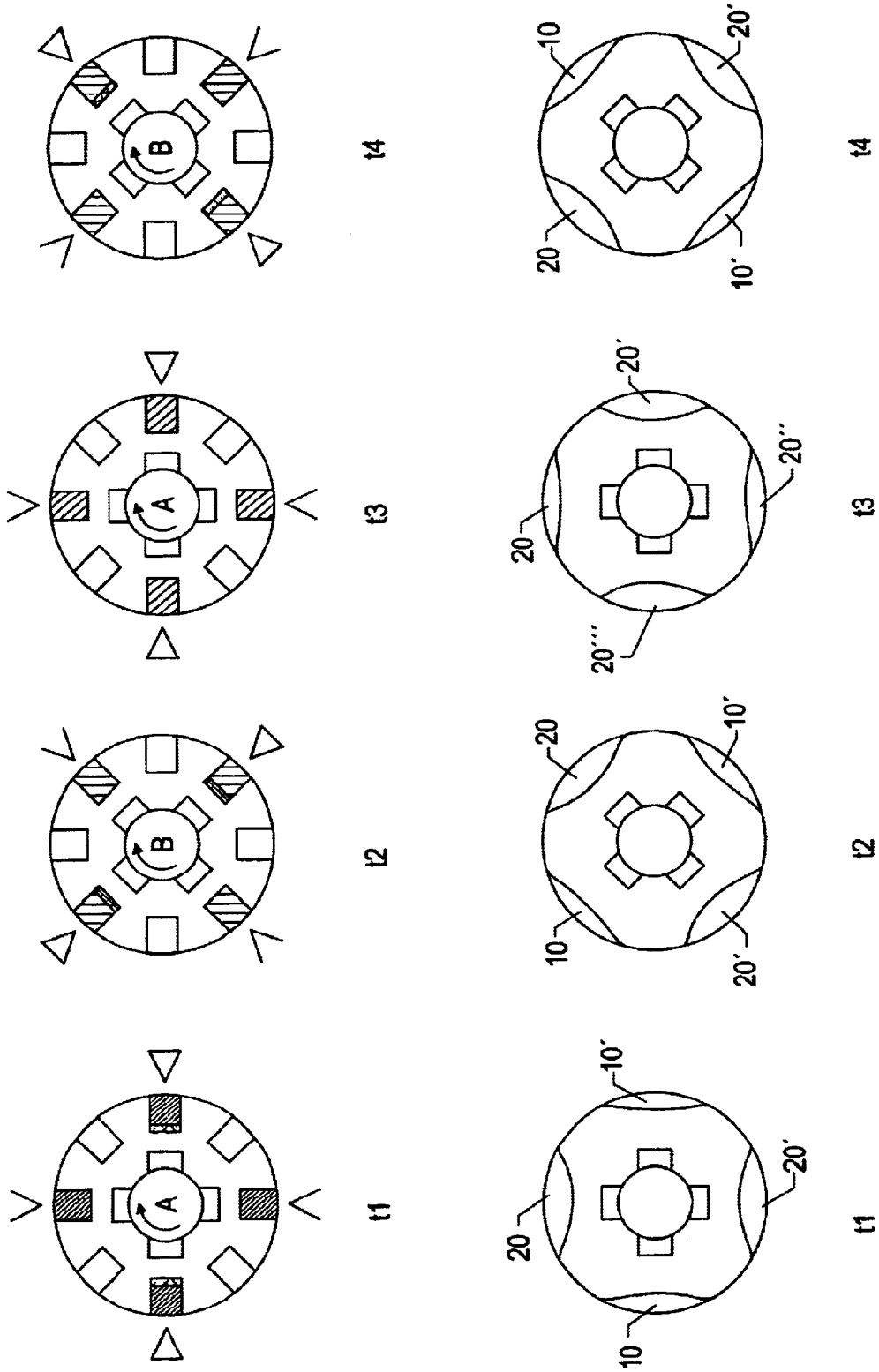

Continuing with FIG. 6C, a more complicated series of energizations is depicted. At t1, phase A is energized so that the four stator poles with hatch lines are energized. The rotor is shown disposed within the stator poles and has four rotor poles. Two of the stator poles are modified according to the present invention and are presented with darkened pole ends to differentiate them from the other two stator poles.

The modified stator poles produce a different normal force profile as discussed previously in contrast to that of the unmodified poles. The resulting normal force profiles for the interaction of the modified stator poles with respective rotor poles are shown as the radially opposed "Δ's" around the stator. Similarly, the resulting normal force profiles for the interaction of the unmodified stator poles with respective rotor poles are shown as the radially opposed "V's" around the stator. The resulting deflections are depicted below as before.

With the subsequent energization at time t2, the rotor has been displaced, and phase B is energized. Note that the two of the phase B stator poles are modified according to the present invention and produce a dissimilar normal force on the stator. The arrangement of the deflections is also displaced.

With energization and time t3, the rotor again is displaced, and phase A is energized. Note that none of the stator poles at time t3 is modified. Accordingly, all of the normal forces involve the interaction of unmodified stator poles with rotor poles distributed around the stator. All of the deflections are substantially similar.

At time t4, Phase B is energized, as the rotor rotates. Now, two of the stator poles are modified according to the present invention and produce a dissimilar normal force. The normal forces can thus be altered at a given time and/or over time with the present arrangement. The changing normal forces during subsequent energizations on the same phase on a stator pole can be accomplished electrically. Details are presented later in the present discussion.

Figure 6D:
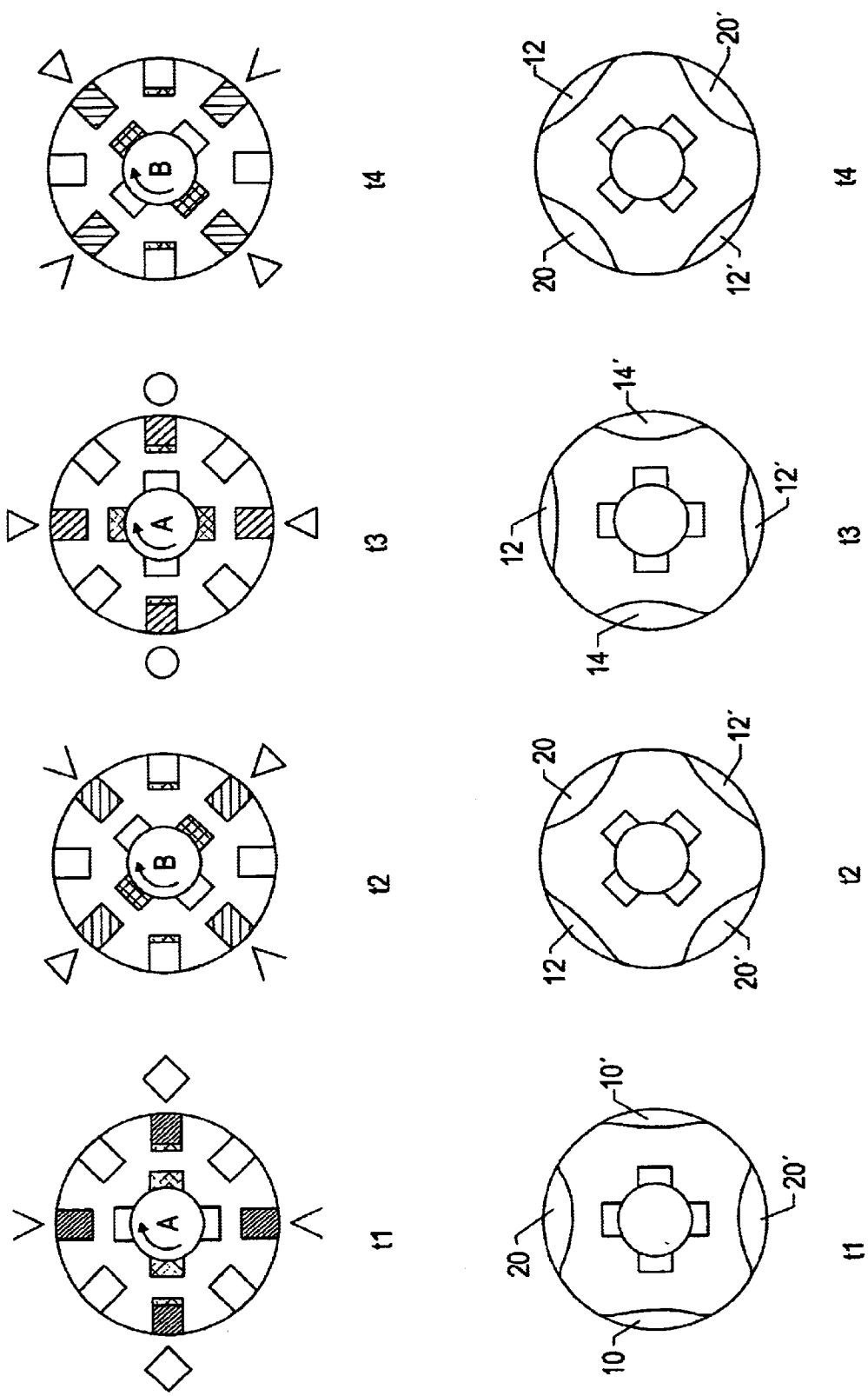

Turning to FIG. 6D, a more complicated series of energizations is depicted. At t1, phase A is energized so that the four stator poles with hatch lines are energized. The rotor is shown disposed within the stator poles and has four rotor poles. Two of the rotor poles are modified according to the present invention and are depicted as darkened poles. Also, two of the stator poles are modified according to the present invention and are presented with darkened pole ends to differentiate them from the other two stator poles.

The modified rotor and stator poles produce a different normal force profile as discussed previously than those of the unmodified poles. The resulting normal force profiles for the interaction of the modified stator poles with modified rotor poles are shown as the radially opposed "◊'s" around the stator. This normal force produces a deflection 10. Similarly, the resulting normal force profiles for the interaction of the unmodified stator poles with respective rotor poles are shown as the radially opposed "V's" around the stator. This normal force produces a deflection 20.

With the subsequent energization at time t2, the rotor has been displaced, and phase B is energized. The distribution of normal forces around the stator involves interactions of unmodified stator poles with unmodified rotor poles. A "V" denotes the normal forces. Also, interactions of unmodified stator poles with modified rotor poles occur at time t2 and are denoted by "Δ's". This normal force produces a deflection 12.

With the subsequent energization at time t3, the rotor continues to rotate as the phases A is energized. The distribution of normal forces around the stator involves interactions of modified stator poles with unmodified rotor poles. The normal forces are denoted by a "o". This deflection is represented as 14 below. Also, interactions of unmodified stator poles with modified rotor poles occur at time t2 and are denoted by "Δ's". With energization at t4, the distribution of the forces continues to alter around the stator. As a result the noise produced is less than is produced by conventional reluctance machines that have substantially equal and similar normal forces acting on all the poles of a given phase during successive energizations.

As discussed above, in accordance with certain aspects of the present invention, the mechanical design or electrical energization of a reluctance machine may be controlled such that—for the energization of a given stator winding over a given time—one or more of the stator poles energized by the given stator winding experiences normal forces that are different from those experienced by other of the stator poles.

With the understanding of how normal forces can be made different from one another and how they can be distributed around the stator of a reluctance machine at a given time and/or over time, further details of how differing normal force profiles are mechanically produced will be discussed. Focus is first placed on mechanical modification of the rotor to achieve noise reduction in the reluctance machine.

One exemplary embodiment of a machine having a construction in which one or more of the stator poles energized by the given stator winding experiences normal forces that are different from those experienced by other of the stator poles is illustrated in FIG. 7A.

Figure 1A:
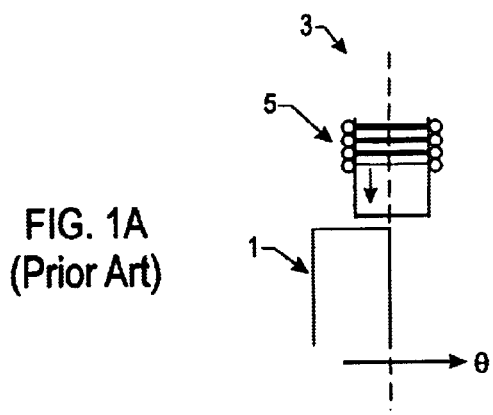
FIG. 1A illustrates an exemplary rotor pole as it rotates into and then past alignment with a stator pole.
Figure 1C:
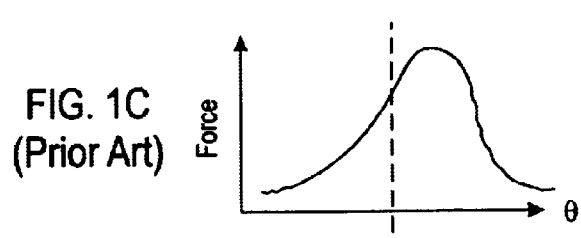
FIG. 1C generally illustrates the normal forces exerted on the stator pole as a function of the angular position of the rotor pole for the illustrated current waveform of FIG. 1B.
Figure 1B:
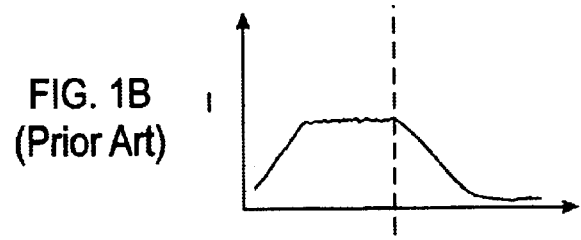
FIG. 1B shows an exemplary current supplied to a coil surrounding the stator pole of FIG. 1A.
Figure 2A:
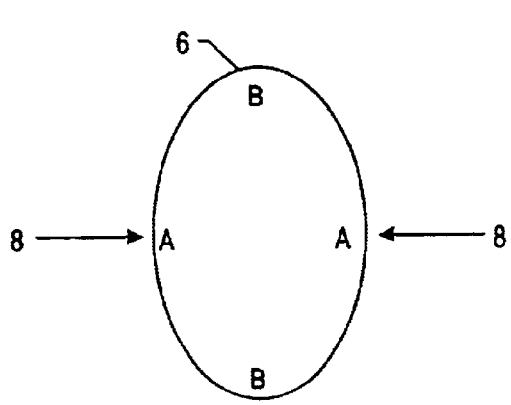
FIGS. 2A–2B generally and schematically illustrate the types of "deflection modes" that are established in switched reluctance machines having two, three, and four normal forces, respectively.
Figure 2B:
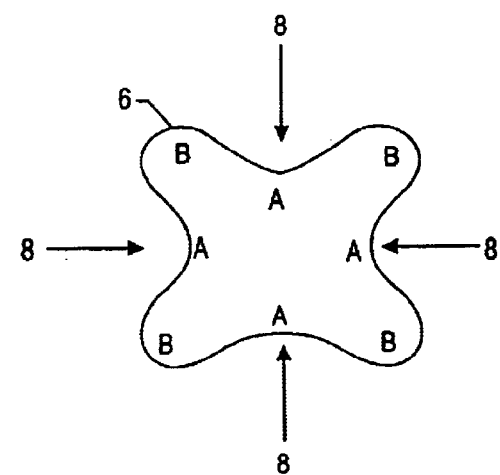

FIG. 7A shows a sectional view of a two-phase, four-mode reluctance motor. The motor has a stator 20 formed from a stack of substantially identical magnetically permeable laminations that forms a yoke disposed around a central bore 30. A plurality of poles 22 extends from the stator yoke into the central bore. In the exemplary embodiment of FIG. 1, there are eight stator poles that may be divided into four pairs of radially opposed poles 22a-a', 22b-b', 22c-c', and 22d-d' are situated around the yoke. Each of these stator poles has a face 24.

Phase windings 26 and 28 are disposed around the phase A and phase B stator poles respectively for generating magnetic fields that extend from the stator poles into the central bore. Phase windings 26 and 28 are alternately disposed on every other stator pole and are wound such that for every pole of one polarity there is a corresponding pole of an opposite polarity. Thus, it may be noted that the coils comprising phase winding 26 are disposed about radially opposed stator poles 22a-a', 22b-b', while the coils comprising phase winding 28 are disposed about radially opposed stator poles 22c-c', and 22d-d'.

A rotor 40 is disposed in the central bore 30 for rotation therein. The rotor 40 has four outwardly extending poles. The poles of the rotor are divided into radially opposed pairs 42a-a', 42b-b'.

Because each phase winding includes coils encircling two radially opposed pairs of stator poles, and because the rotor has four outwardly extending rotor poles, the exemplary motor of FIG. 7A is a four mode motor. As such, during each energization of a phase winding there will be four substantially localized areas where normal forces will act on the stator.

In accordance with one exemplary aspect of the present invention the outwardly extending poles of the rotor are mechanically constructed to ensure that the normal forces exerted on some of the stator poles energized by a given phase winding are different form the normal forces exerted on other of the stator poles energized by that phase winding. To that end, the rotor poles comprising radially opposed pair 42a-a' are constructed to have a uniform face 44 while the rotor poles comprising radially opposed pair 42b-b' are constructed to have a non-uniform, notched face designated 46.

A controller 50 is coupled to the switched reluctance machine. The controller generally has phase drivers, power supply, speed control, and circuitry with which to control the energizations of the reluctance machine. to effect rotation of the rotor in accordance with energization techniques generally known in the art of switched reluctance motors.

The notched faces 46 on radially opposed rotor poles 42b-b' are formed such that, as the phase windings 26 and 28 are energized and the rotor rotates with respect to the stator, the normal forces experienced by the stator poles will be dissimilar. Thus, for example, when phase winding 26 is energized and the rotor is rotating clockwise normal forces will be established on stator poles 22a-a' that generally follow the curve reflected in FIG. 7B, while, under the same circumstances, normal forces will be established on stator poles 22c-c' that generally follow the curve presented in FIG. 7C.

As the two-phase electronic commutation excites the phase windings 26 and 28 in proper sequence, the rotor 40 moves relative to the stator 20. Specifically, the excitation of the phase windings produces a north and south pole on the radially opposed pair of poles 22. The excited windings also create a magnetic flux path that passes through the polarized pair, the rotor and the yoke. In response to the flux, rotor 40 moves to bring rotor poles 42 into minimum reluctance relation relative to the polarized pair of stator poles. The minimum reluctance relation corresponds to the point of maximum inductance of the energized stator pole.

To further illustrate the interaction of modified and conventional rotor and stator poles, a series of figures are presented. FIGS. 8A–8C depict the interaction of a rotor pole 42 with a stator pole 22. The poles described constitute part of the switched reluctance motor and are isolated from the motor for the purposes of illustration.

The interaction of conventional rotor poles and stator poles, as discussed previously in FIG. 4D, is repeated here in FIG. 8A as Curve A. In contrast to the induction Curve A, the inductance curve B, in FIG. 8B, shows the change in inductance as a function of the angular position of a notched faced rotor pole 42b in relation to a uniform faced stator pole 22. Distinct changes in the slope of the inductance curve occur as the notched faced rotor pole moves in relation to the stator pole. The inductance climbs steadily 1 as the rotor pole approaches. A decrease in slope 2 then results in the inductance as the notch in the face of the rotor pole begins to interface with the stator pole. The change in inductance results from the absence of magnetically permeable material due to the presence of the notch. The two poles then reach maximum inductance 3 when they align, and the inductance curve declines 4 in a similar fashion as the poles pass out of relation. As evidenced, curve B has a non-uniform profile for the electrical interaction of a notched faced rotor pole with a uniform face stator pole as they pass in relation to one another.

The different inductance curves A and B create dissimilar normal force profiles for the interactions between uniform and uniform poles and between notched and uniform poles. It will be appreciated that, even though the present illustrations show the variation of uniform or notched faced rotor poles interacting with uniform stator poles, additional combinations of interactions are envisioned that will also produce dissimilar normal force profiles.

FIG. 8C helps to further illustrate the difference between conventional normal force profiles between poles with uniform faces and those normal force profiles presented according to the present invention. Graph 8C shows the magnitude of the normal force as a function of rotor pole position. As evidenced in curve A, the normal force profile for the rotor poles 42a with uniform face 44 in relation to the stator pole 22 has a uniform, parabolic shape that reaches a maximum as the poles come near minimum reluctance.

In contrast, curve B provides an alternate normal force profile for the rotor pole 42b with notched face 46 in relation to stator pole 22 with uniform face 24. In this instance, the change in the magnitude of the normal force as the rotor pole displaces in relation to the stator pole has a non-uniform profile. Notably, the curve has two humps. The first hump is larger due to the fact that the stator pole remains energized, while the second hump is diminished due to the cutoff of the current to the stator pole.

Although two normal force profiles are depicted, any number of possible normal force profiles can result from various combinations of pole faces. As the reluctance motor operates, the interactions of rotor poles and energized stator poles will have normal force profiles that alternate depending on the faces that interact at a given energization. Thus, notched-faced poles can be used to phase the primary modes of deflection of the stator.

Additionally, an exemplary rotor where the length of the rotor poles is different at various points so as to create differing normal forces on the stator poles is shown in FIG. 10. A first set of the rotor poles A-A' have a first given length L (when measured form the tip of the pole to the yoke of the rotor). The resulting air gap between rotor poles A-A ' and the respective stator poles is given by g. A second set of rotor poles B-B' have a second given length l which is different from the first given length L. The resulting air gap between rotor poles B-B' and the respective stator poles is given by G.

The difference in lengths L and l means that poles A-A' have a different inductance profile than poles B-B'.

Consequently, the normal forces produced as the rotor poles pass in relation to energized stator poles will also be different. Therefore, the presentation of such a rotor having varied lengths of poles establishes differing normal forces as described above. It will readily be understood that the present modifications can also apply to varied lengths of stator poles in order to establish differing normal forces as described above.

For purposes of the embodiment of FIG. 7A, the precise form of the rotor poles is not critical as long as the rotor poles are constructed to establish different forces on the stator poles. In some of the illustrated embodiments, the notches on rotor poles are used to provide the differing forces. Alternate embodiments with a number of alternative notches for both rotor and stator pole faces are illustrated in accordance with the present invention. The poles are constructed of a stack of laminations, and typically the height of the stack that forms the pole is much greater than its width.

A notched face in FIG. 9A represents a deep, U-shaped indentation 20a along the radial center of the pole face 10, extending from the top 30 of the pole to the bottom 40 of the pole. The top of the pole and the bottom of the pole are differentiated from the leading edges 50 of the pole. The leading edges are the portions of the pole that first come into relation with an opposing pole when the motor is in operation.

In like manner, a notched face in FIG. 9B represents a wide, chamfered indentation 20b in the pole face 10, also centrally located in the pole and extending from the top to the bottom of the pole. Also, a notched face in FIG. 9C represents a shallow indentation 20c in the pole face 10, while a notched face in FIG. 9D represents a raised indentation 20d in the pole face 10. Finally, a notched pole in FIG. 9E represents an offset notch 20e not located on the radial center 30 of the pole 10. For contrast to the notched faces in FIGS. 9A–E, a uniform face 10f is presented in FIG. 9F to illustrate the typically uniform face of a switched reluctance motor pole.

As those of ordinary skill in the art will appreciate, the use of notches can, in some instances, create rotor poles that may interact with the air surrounding the rotating rotor when rotating at high speeds. Noise then results from the "trapping" of air in the notched regions of the rotor pole. Such noise is sometimes referred to as "windage" noise. Alternative rotor designs that have decreased tendency to produce windage noise are envisioned that also meet the objectives described above of altering the radial forces established when the rotor poles move towards and into alignment with the stator poles.

One such alternative embodiment involves the use of closed or "semi-closed" rotor poles that include areas near the pole face of the rotor pole to be modified that have magnetic material removed so as to leave an air gap or a portion of the rotor that includes material that will not conduct magnetic flux. An example of a rotor pole having a closed configuration is provided in FIG. 9G, where a portion of the rotor pole material has been removed to define a bore 20g passing through the rotor pole face 10. The use of a closed rotor pole allows for control of the radial forces established as the closed rotor pole moves towards and into alignment with the stator poles, but does not have the same tendency to produce windage noise as a notched rotor pole.

Because a notch or bore may involve the absence of magnetically permeable material from the pole, it is conceivable that a magnetically non-permeable material could be inserted into the depression, notch or bore and still have the desired effect of affecting the normal forces. Such use of non-permeable material could be advantageous in avoiding the issue of windage described above as well as other associated problems.

A still further alternate embodiment involves the utilization of a rotor wherein the length of the rotor poles is different at various points so as to present differing air gaps to the stator poles associated with an energized phase winding. One exemplary rotor pole having such a construction is shown in FIG. 9H. The pole face 10 is provided with a step so that the length of the rotor poles is different at portion 20h. As a result, differing air gaps are presented to the stator poles associated with an energized phase winding as the rotor poles pass in relation.

FIG. 9I shows two embodiments of notches that pass through the laminations that construct the pole without altering the actual face of the pole. An axial bore 20i passes from the top of the pole 30, through the myriad of laminations that make the pole, and to the bottom of the pole 40. The axial bore may have a variety of shapes in order to affect the normal force profile associated with the pole. Bore 20i is a cylindrical bore, while bore 21 also in FIG. 9I is a half-cylindrical bore.

FIG. 9J shows a notch in the pole face 10 having a narrow opening 20j in the pole face. The notch also has a wider bore section 22 that passes through the laminations of the pole from the top 30 to the bottom 40 of the pole.

FIG. 9K shows another embodiment of a notch 20k in a pole face 10 according to the present invention. The notch runs along the width of the pole face from a leading edge 50 to a trailing edge 50', instead of those described above that pass from the top 30 to the bottom 40 of the pole.

FIG. 9L illustrates an 8/4-reluctance machine having rotor poles as embodied in FIG. 9H. The reluctance machine includes a stator 10 having four radially opposed pairs of stator poles 30a–d. The poles each have a face 32. Disposed within the stator 20 is a rotor 40. The rotor has two radially opposed pairs of rotor poles 40a–b. Each of the rotor poles has a defined as having a step as embodied in FIG. 9H. The radially opposed pair 40a-a' has a face 50, while the radially opposed pair 40b-b' has a face 51.

The rotor pole faces 50 of the pair 40a-a' includes a first portion 52 of the pole that is further from opposing stator poles faces than a second portion 54. As the rotor pole turns in the clockwise direction, for example, the first portion 52 of the pair 40a-a' is first brought into relation with an energized stator pole. As the rotor then is displaced further clockwise, the second portion 54 comes into relation with an energized stator pole. Thus, for rotor pole pair 40a-a', the first 50% of rotor pole alignment with energized stator poles involves the first portion 52 with a less inductive material.

In contrast, the rotor pole faces 51 of the pair 40b-b' includes a first portion 56 of the pole that is closer to opposing stator poles faces than a second portion 58. As the rotor pole turns in the clockwise direction, for example, the first portion 56 of the pair 40b-b' is first brought into relation with a given, energized stator pole. As the rotor then is displaced further clockwise, the second portion 58 comes into relation with an energized stator pole. Thus, for rotor pole pair 40b-b', the first 50% of rotor pole alignment with energized stator poles involves the first portion 56, while the second 50% of rotor pole alignment involves the second portion 58 with a less inductive material.

Given the arrangement of pole faces 50 on pair 40a-a' and pole face 51 on pair 40b-b', the stator encounters two, substantially different normal forces in 90 degree opposition to one another on the stator pole. With each energization, the specific deflection mode resulting from these differing normal forces is repeated around the stator.

The depth, width and location of the notch on the pole face directly determine the normal force profile that will be produced when a rotor pole passes in relation to an energized stator pole. Since the notch involves the addition or absence of ferromagnetic material, the inductance depends accordingly on the position and magnitude of the modification as the poles pass in relation to one another. For example, radially opposed pair of poles with symmetrically offset notches produces diametrically opposed normal force profiles. This arrangement contrasts with radially opposed pairs with asymmetrically offset notches where the normal forces are not diametrically opposed.

As an additional example, a deep notch on a pole face generally reduces the noise pike at 1× the fundamental commutation frequency, but may create an additional noise pike 2× the fundamental. A more shallow notch, though, can lessen the additional noise pike at the 2× fundamental commutation frequency.

Those knowledgeable in the related arts will understand that rotor poles generally have a convex surface for their face, while stator poles generally have a concave surface for their face. The notched faces presented according to the present invention constitute a modification of the typical pole face. The modification is made to alter the inductance between poles and thereby alter the normal force acting between poles.

It will also be appreciated that the present embodiments for the various notches does not exhaust all representations and that a variety of deep, shallow, raised or offset modifications can be envisioned in accordance with the present invention. Furthermore, the modification does not necessarily require that it extend from the top to the bottom of the pole face. Consequently, the notch can be a bore, plug, or series of such modifications on only part of the pole face.

As with the rotor, the stator of a reluctance machine may have different stator pole configurations to mechanically alter the normal forces on the machine. The different stator pole configurations can be used in isolation from or in combination with other configurations disclosed herein.

The use of a stator having different stator pole configurations is believed to be particularly advantageous in two mode reluctance machine systems. In such systems, modification of the rotor to provide alternating normal forces would have a tendency to render the rotor unbalanced and potentially result in unwanted vibration (and vibrational noise) as the rotor rotates with respect to the stator.

FIGS. 11A–B illustrate the particularly advantageous use of modification of the stator in two mode reluctance machine systems. FIG. 11A shows a 4/2-reluctance machine 10 with two phases. Because the rotor 20 has little material, the modified face 22 can create an imbalance as the rotor rotates relative to the stator. For this reason, a modified face on a stator pole is potentially more advantageous.

FIG. 11B shows a 4/2-reluctance machine 10 with two phases. Stator pole 12 has a modified face 14. Therefore, the rotor 20 will not be unduly imbalanced as it rotates relative to the stator, and still noise is reduced due to differing normal forces acting on the stator.

FIG. 11C shows another 4/2-reluctance machine 10 with two phases. Stator poles 11 and 11' have standard faces 13 and 13', while stator poles 12 and 12' has a modified faces 14 and 14'. Therefore, the rotor 20 will not be unduly imbalanced as it rotates relative to the stator, and still noise is reduced due to differing normal forces acting on the stator in time phase.

In addition to the modification of the stator pole faces to reduce noise of the reluctance machine in accordance with the present invention, the lengths of the stator to poles can be made dissimilar to achieve the effect of differing normal forces acting on the stator. FIG. 11D shows a simplified arrangement of a 4/2-reluctance machine 10 with dissimilar stator pole lengths. Stator poles 12 and 12' have a length L as measured from the yoke to the free end of the stator pole. The length L differs from the length l of stator poles 14 and 14'. Although radially opposed pairs are depicted with disparate lengths, it is conceivable that only one or some of the stator poles be provided with a differing length.

The preceding discussion focused on mechanical means for controlling the normal forces established in a reluctance machine so as to reduce noise. It will be appreciated that the normal forces can also be differed electrically by controlling the manner in which a reluctance machine is energized.

It has also been discovered by the present inventor that noise in a reluctance machine can be reduced by altering the normal forces established by the energization of one or more phase windings so that the normal forces associated with the energization of a phase winding at a given point in time are different from the normal forces associated with the energization of the same or a different phase winding at a later point in time. In other words, the normal forces may be varied from one commutation cycle to the next.

Given the mechanical solution of a notched face pole to reduce noise, electrical solution also exists for providing differing normal force profiles to reduce noise in a reluctance machine. First, the current that energizes the stator poles during the series of energizations can be provided with dissimilar profiles. The dissimilar current profiles can be used independent of or in conjunction with other modifications to achieve noise reduction in the reluctance machine.

Referring to the 8/4-switched reluctance motor described earlier, FIG. 12A illustrates dissimilar current profiles for radially opposed stator poles 22a-a'. Typical current profiles, as described previously, involve a ramp increase 1 to energize the stator pole. Then, the current is maintained at a constant level 2 to bring the rotor pole into minimum reluctance relation to the stator pole. Once the rotor pole has aligned with 50% of the stator pole, the current undergoes a sharp cutoff 3. The current decreases 4. The rotor pole reaches minimum reluctance as it aligns 100% with the stator pole, and the rotor pole passes the stator pole.

Figure 3A:
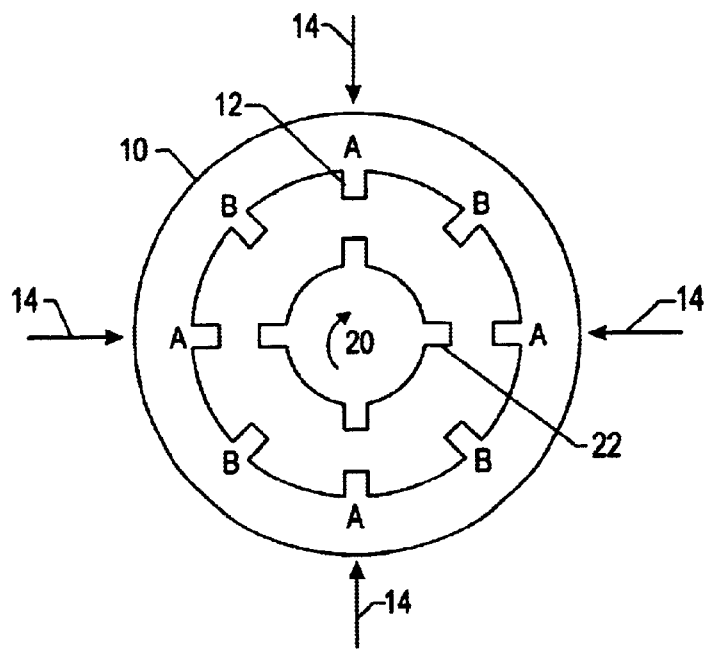
FIGS. 3A and 3B illustrate how equal normal forces are distributed around a stator during subsequent phase energizations.
Figure 3B:
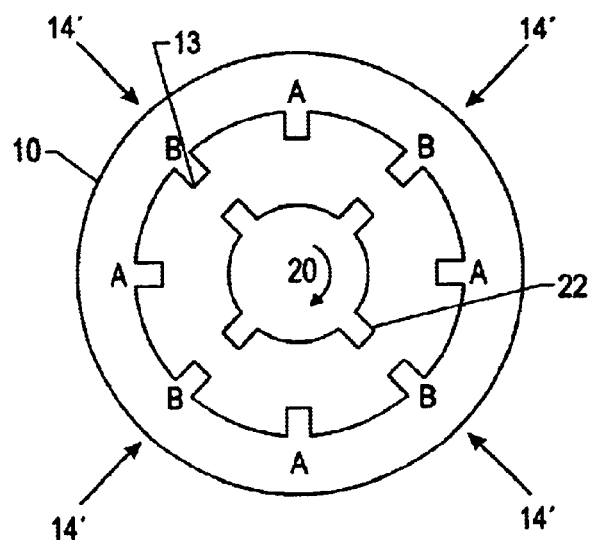

An additional current profile is shown according to the present invention, as also depicted in FIG. 3D. The second current profile would occur at a subsequent energization of the stator poles 22a-a' in the series of energizations or the energization cycles. Again, the second current involves a ramp increase 1' to energize the stator pole. Then, the current is maintained at a constant level 2' to bring the rotor pole into minimum reluctance relation to the stator pole. Once the rotor pole has aligned with 50% of the stator pole, the current undergoes a sharp cutoff 3'. The current is then decreased 5. The rotor pole then reaches minimum reluctance as it aligns 100% with the stator pole, and the rotor pole passes the stator pole. The independent phase leg 5 has a different degree of decay of the current supplied to the stator pole than the independent phase leg 4. The apparatus of the controller determines the independent phase leg supplied in the series of energizations.

The two current profiles create distinct normal force profiles at the energized stator pole when a rotor pole passes in relation. FIG. 12B depicts two possible normal force profiles resulting from dissimilar current profiles supplied to a stator pole at subsequent energizations. Curve A represents the typical normal force profile that develops from the use of independent phase leg 4. Curve B shows a quite distinct normal force profile resulting from the use of independent phase leg 5 with a steeper current decay. Consequently, the normal force profile of curve A has a larger maximum than curve B and occurs at different degree of alignment.

Although two current profiles are depicted, any number of possible current profiles can energize the stator poles during the series of energizations. As the switched reluctance motor operates, the controller can provide a multitude of current profiles with which to alter the normal forces acting on the stator. Thus, the use of different current profiles in the series of energizations, like the notched face pole, can also be used to phase the primary modes of deflection of the stator to reduce noise.

Still further, electrical control of the forces can be obtained by controlling the number of coil turns used in the various phase windings. The phase windings for the various stator poles may be given differing number of wrappings to produce dissimilar normal forces acting on the stator. FIG. 12C shows a simplified arrangement of a 4/2-reluctance machine 10 with dissimilar phase windings 16 and 18. Phase windings 16 are wrapped around stator poles 12 and 12', while phase windings 18 are wrapped around stator poles 14 and 14'.

The windings 16 have more wrappings of wire to form the coil than those of windings 18. As a result, the magnetic field produced by stator poles 14 and 14' with the energized phase windings 16 will differ from that of poles 12 and 12' with greater phase windings 18. The normal forces produced by stator poles 14-14' will be less than produced by 12-12'. Hence, for the energization of a given stator winding over a given time—one or more of the stator poles energized by the given stator winding experiences normal forces that are different from those experienced by other of the stator poles.

With the present understanding of the effect of using the various modifications described herein to provide differing normal forces, additional embodiments of switched reluctance motors in accordance with the present invention are presented. Although winding for two phases is depicted in the present and foregoing illustrative embodiments, the present invention applies to reluctance machines with a greater number of phases. The presentation of two-phase reluctance machines is only done for simplicity. Additionally, it is also to be understood that the stator/rotor combinations presented herein do not limit the possibility of the present invention applying to ratios for reluctance machines not explicitly shown.

With reference to FIG. 13, a sectional view of a three-phase 12/8-switched reluctance motor 10 in accordance with the present invention is illustrated. The rotor has six radially opposed pairs of poles situated radially around stator 20. These pairs of radially opposed rotor poles are divided into two sets. First set 30 is composed of radially opposed rotor poles 30A, 30B, and 30C with each pole having a notched face 32. Second set 34 is composed to 34A, 34B, and 34C with each pole having a uniform face 36. As evidenced, the first and second sets are situated around the stator yoke such that the radially opposed pairs alternate for each set. Rotor 40 has four pairs of radially opposed poles 1-1', 2-2', 3-3' and 4-4'.

As the phases A, B, and C are energized to rotate the rotor, the stator will oscillate between two configurations of deflection. As phase B is energized, rotor pole pairs 2-2, and 4-4' with uniform faces will be brought into relation to the energized stator poles of phase B having notched faces on pair 30B and uniform faces on 34B.

As phase C is then energized, the rotor pole pairs 1-1' and 3-3' with uniform faces are brought into relation to the energized stator poles of Phase C having notched faces of 30C and uniform faces of pair 34C. The stator will have a four-mode deflection that is similar to that of phase B, but will be offset around the stator yoke by 30°. As phase A then energizes, the configuration takes on a four mode deflection that is similar in nature to what occurred in phase B and C above, but the four mode deflection is offset 30° from the alignment of Phase C.

As a result of the present motor configuration where the differing normal force profiles are situated as part of the stator poles, the deflection of a single stator pole 30 or 34 will be the same for each energization of its phase winding. Therefore, the deflection of the stator at a given location does not change at a given time in the series of energizations. Rather, the four-mode deflection changes alignment around the stator with each energization of the series.

Referring to FIG. 14, another stator/rotor configuration is illustrated in accordance with the present invention. The distinctive feature of the present embodiment lies in the fact that all of the stator poles 30 have a uniform face 32 while the rotor has a combination of notched and uniform faces. Referring specifically to rotor 40, the rotor contains four radially opposed pairs of poles. The radially opposed pairs are further divided into two sets. The first set 42 contains radially opposed pairs 1-1' and 2-2' with each pole of the set having a notched face 44. The second set 46 contains radially opposed pairs 3-3' and 4-4' with each pole of the set having a uniform face 48. First and second sets are situated such that the radially opposed pairs alternate around the rotor.

As the phases A, B, and C are energized to rotate the rotor of FIG. 14, the stator oscillates between configurations of four-mode deflection. As phase B is energized, rotor pole pairs 2-2, and 4-4' with notched faces will be brought into relation to the energized stator poles of phase B. The stator will have a four-mode deflection that is different across radially opposed pair 30B-B" from 30B'-B'''.

As phase C is then energized, the rotor pole pairs 1-1' and 3-3' with notched faces are brought into relation to the energized stator poles of Phase C. The stator will have a four-mode deflection that is different across radially opposed pair 30C-C" from 30C'-C''', yet the stator will have a four-mode deflection that is similar to that of phase B. Furthermore, the four-mode deflection will be offset around the stator yoke by 30°, relating to the angular displacement of the stator poles of differing phases. As phase A then energizes, the configuration takes on a four mode deflection that is similar in nature to what occurred in phase B and C above, but Phase A is offset 30° from the alignment of Phase C.

As a result of the present motor configuration where the differing normal force profiles are adjacent on the rotor, the deflection of a single stator pole 30 will change with each energization of its phase winding. The change will involve a cadence of normal and modified deflections of a given stator. The deflection of the stator at a given location changes at a given time in the series of energizations.

Referring to FIG. 15, a 12/8-switched reluctance motor, is illustrated in accordance with the present invention. The notable difference of the present embodiment in contrast to previous embodiments lies in the fact that the stator 20 has two sets of radially opposed pairs of poles 30 and 34, while the rotor 40 contains four radially opposed pairs of poles 42 with uniform face 44. The first set 30 of radially opposed stator poles includes 30*a*-*a'*, 30*b*-*b'*, and 30*c*-*c'*. The second set 34 of radially opposed stator poles include 34*a*-*a'*, 34*b*-*b'*, 34*c*-*c'*. The first and second set are situated around the rotor yoke in such a manner that they alternate.

Referring to FIG. 16, a 12/8-switched reluctance motor is illustrated in accordance with the present invention. The notable difference of the present embodiment in contrast to previous embodiments lies in the fact that all of the stator poles 30 have uniform faces 32 while the rotor poles 42 have notched faces 44.

Referring to FIG. 17, a 12/8-switched reluctance motor is illustrated in accordance with the present invention. The notable difference of the present embodiment in contrast to previous embodiments lies in the fact that all of the stator poles 30 have notched faces 32 while the rotor poles 42 have uniform faces 44.

FIG. 18 shows a three-phase, 12/8 reluctance motor according to the present invention. For the present embodiment, all of the stator poles 30 have a uniform face, and all of the rotor poles 42 also have a uniform face. A controller 50 is shown connected to three Phases A, B and C that are wound alternating about the stator poles.

The controller is designed in such a manner as to provide 6 independent phase legs for the current that energizes the phase windings. Recall that the normal force profile for the interaction of a stator pole with a rotor pole can be controlled electrically by use of an independent phase leg on the current profile used to energize a stator pole.

Current leg 1–6 are shown supplied to radially opposed stator pole pairs of 1-1', 2-2', 3-3', 4-4', 5-5', and 6-6' respectively. Only one, some or all of the current legs may be independent in profile. As the reluctance machine operates, the independent phase legs create differing normal forces at the stator poles that they energize. Therefore, the modes of deflection of the stator can be altered electrically. It is also conceivable that the controller is capable of supplying more than one current leg with which to energize the stator poles. For example, radially opposed stator poles 1-1' could be supplied with a first independent current leg during a first energization, and then supplied with a second independent current leg during a later energization.

FIG. 19 shows a three-phase, 12/8 reluctance motor according to the present invention. All of the radially opposed pairs of stator poles 30 have a uniform face 32. The rotor poles 42 are divided into a first set with radially opposed pairs 1-1' and 3-3' having notched faces 44. The second set of rotor poles of radially opposed pairs 2-2' and 4-4' have uniform faces. Phase A has radially opposed stator poles 1-1' and 4-4'. Phase B has radially opposed stator poles 2-2' and 5-5'. Phase C has radially opposed stator poles 3-3' and 6-6'.

As the phases A, B, and C are energized to rotate the rotor, the stator will oscillate between two configurations of deflection. As phase B is energized, rotor pole pairs 2-2', and 4-4' with uniform faces will be brought into relation to the energized stator poles of phase B. The stator will have a four-mode deflection that is substantially equal on all of the poles for the Phase B. As phase C is then energized, the rotor pole pairs 1-1' and 3-3' with notched faces are brought into relation to the energized stator poles of Phase C.

Each of the deflections at the stator poles of Phase C will be substantially equal to each other, yet the stator will have a four-mode deflection that is different than that of phase A. Furthermore, the four-mode deflection will be offset around the stator yoke by 30°, relating to the angular displacement of the stator poles of differing phases. As phase A then energizes, the configuration takes on a four mode deflection that is similar in nature to what occurred in phase B above, but Phase A is offset 30° from the alignment of Phase B.

As a result of the present motor configuration where the differing normal force profiles alternate on the rotor, the deflection of a single stator pole 30 will alternate with each energization of its phase winding. Therefore, the deflection of the stator at a given location changes at a given time in the series of energizations.

FIG. 20 shows an additional embodiment of a 3-phase, 6/4-reluctance machine. The machine has three radially opposed stator poles A, B, and C, each having a phase. The rotor has two radially opposed pairs of rotor poles 1-1' and 2-2'. Three tables are presented below to illustrate various configurations that can be made with the present embodiment and others discussed herein. The present embodiment and Tables illustrate the interrelation of rotor pole to stator pole ratio and number of phases in regards to the distribution of deflections around the stator with time or location.

First, by making the radially opposed rotor pole pair 1 to have a modification such as a notch, Table 1 illustrates how deflections of the stator change at a given time, but the location of the deflections change over time around the stator. The notched pair of poles 1 is shown in bold and underlined. With the energization of Phase A, the notched poles 1 are brought into relation to the stator pair A of phase A. This corresponds to a first deflection configuration (I) since the normal force profile results from the interaction of notched rotor poles with uniform stator poles.

TABLE 1

| Phase Energization | A | B | C | A | B | C |
|---|---|---|---|---|---|---|
| Rotor Pole pair | <u>1</u> | 2 | <u>1</u> | 2 | <u>1</u> | 2 |
| Deflection Configuration | I | II | I | II | I | II |

Continuing with the Table 1, as phase B is energized, the rotor pair 2 is brought into relation to the stator pair B of Phase B. This interaction corresponds to a second deflection configuration (II) since the normal force profile involved is the result of uniform stator and rotor poles. As Phase C is energized, the rotor pair 1 is brought into relation to the stator pair C of Phase C. This interaction corresponds to the first deflection configuration (I) since the normal force profile involves uniform stator and notched rotor poles. As the table further shows, the two deflection configurations (I, II) alter at given times during the series of energizations. Also, the deflections move around the stator over time with the series of energizations.

Referring to Table 2, the stator pole pair A of the present embodiment is notched or modified according to the present invention. The rotor pole pairs and the other stator pole pairs are provided with uniform faces. Under this arrangement, deflections of the stator change at a given time in the series of energizations. However, the location of deflections remains the same on the stator.

TABLE 2

| Phase Energization | A | B | C | A | B | C |
|---|---|---|---|---|---|---|
| Rotor Pole pair | <u>1</u> | 2 | <u>1</u> | 2 | <u>1</u> | 2 |
| Deflection Configuration | I | II | II | I | II | II |

In Table 2, the energized stator pole pair A with notched or modified poles produces a first deflection configuration (I) as the rotor poles pass in relation. In contrast, the stator pole pairs of B and C uniform faced poles produce a second deflection configuration (II) as the rotor poles pass in relation. As shown in the table, the first configuration (I) occurs at a given time in the energizations and only at the stator pole pair A.

Thirdly, this and other embodiments can be modified such that the deflection of the stator changes over time, and the location of deflections can be made to change around the stator. Table 3 shows an arrangement for the present embodiment where the stator pole pair A is modified, and the rotor pole pair 1 is also modified to produce differing normal force profiles according to the present invention.

TABLE 3

| Phase Energization | A | B | C | A | B | C |
|---|---|---|---|---|---|---|
| Rotor Pole pair Deflection | 1 | 2 | 1 | 2 | 1 | 2 |
| Configuration | I | II | III | IV | III | II |

As a result, a more complex set of deflections makes four different configurations (I, II, III, IV). The distribution of deflections changes over time, and the location of the deflections also move around the stator over time with each phase energization.

FIGS. 21A–L illustrate exemplary embodiments of rotors according to the present invention. Its is to be understood that the embodiments of rotors constitute part of a reluctance machine and are isolated from the machine for the purposes of illustration only. Depending on the number of stator and rotor poles and phases for a given reluctance machine, the present embodiments produce unique deflection modes that can change dynamically in location or time. Although the embodiments may describe the use of one type of notch of pole width, it is conceivable that a rotor can be constant having several notch types and widths in combination.

Figure 21A:
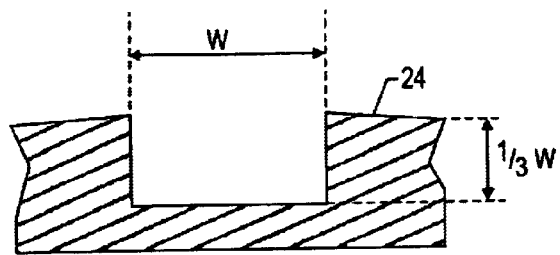
Figure 21A:
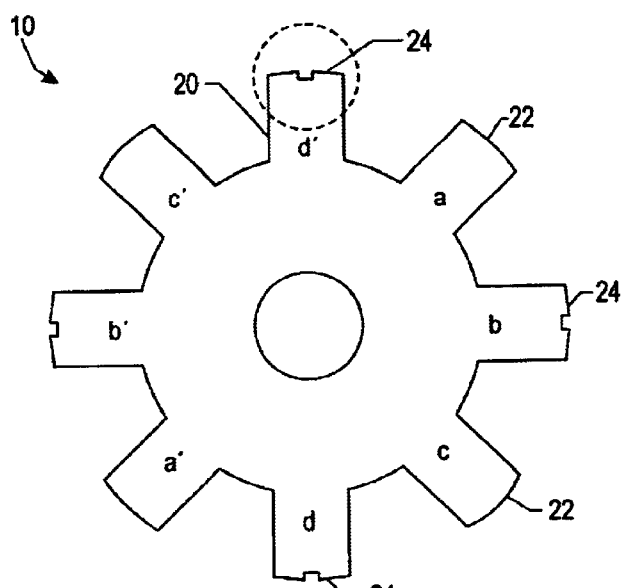

FIG. 21A shows an 8-pole rotor 10. Radially opposed rotor pole pairs 20a-a' and 20c-c' are rotor poles with standard pole faces 22, while radially opposed rotor pole pairs 20b-b' and 20d-d' are rotor poles with modified pole faces 24. The modified faces 24 define a shallow notch within the radial center of the pole face. The shallow notch describes a notch wherein the width of the notch is greater than its depth. Referring to the blow-up detail of the notch 24, example dimensions are provided. The entire width of the pole is W. The depth of the notch may be around ⅓ W. Each commutation for a reluctance machine having the present rotor embodiment would has a different normal force. As a result, the rotor 10 produces different normal force profiles that shift by time and not by position around the stator yoke.

Figure 21B:
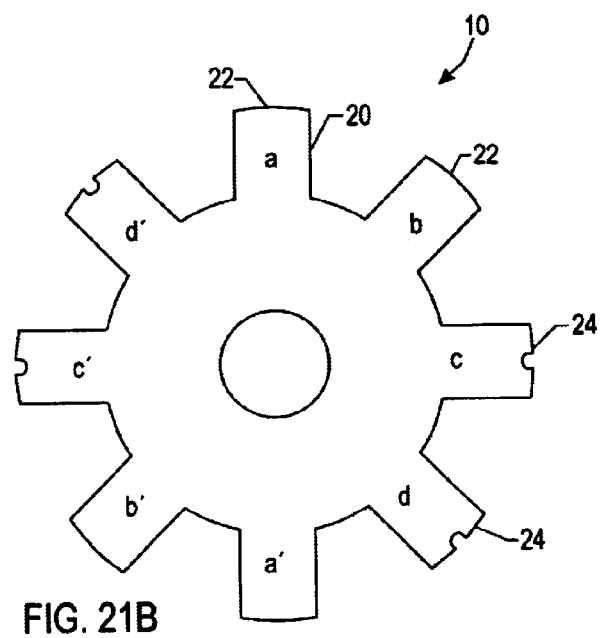

FIG. 21B shows an 8-pole rotor 10. Radially opposed rotor pole pairs 20a-a' and 20b-b' are rotor poles with standard faces 22, while radially opposed rotor pole pairs 20c-c' and 20d-d' are rotor poles with modified faces 24. The modified faces 24 define a deep notch within the radial center of the pole face. The deep notch describes a notch where the depth of the notch is greater than its width. As a result, the rotor 10 has two, adjacent groups of pole pairs that produce different normal force profiles.

Figure 21C:
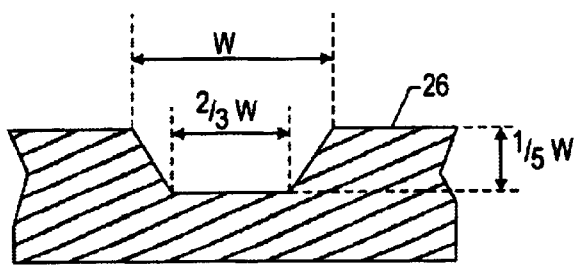
Figure 21C:
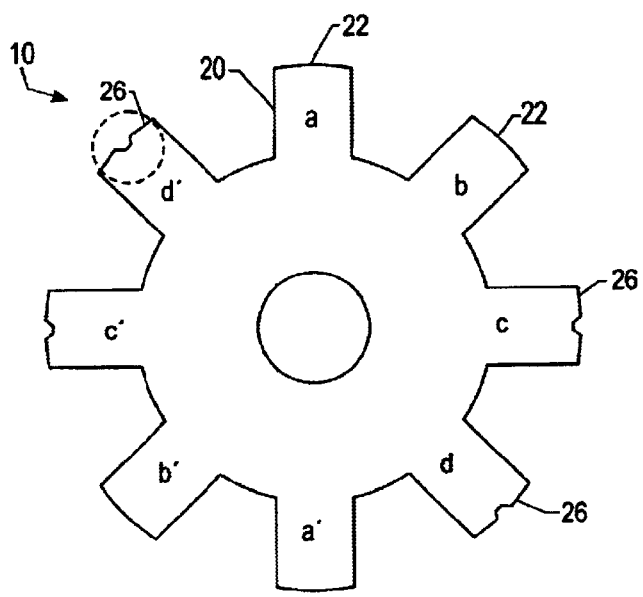

FIG. 21C shows an 8-pole rotor 10. Radially opposed rotor pole pairs 20a-a' and 20b-b' are rotor poles with standard pole faces 22, while radially opposed rotor pole pairs 20c-c' and 20d-d' are rotor poles with modified pole faces 26. The modified faces 26 define a wide and tapered notch within the radial center of the pole face. The wide and tapered notch describes a notch wherein the width of the notch is greater than its depth. Tapering of the notch provides a notch that is relatively 50% wider than just a shallow notch as described previously.

Referring to the blown up detail of the notch 26, example dimensions are provided. The entire width of the notch is W. The deepest portion may have a width of ⅔ W and a depth of ⅕. As a result, the rotor 10 has two, adjacent groups of pole pairs that produce different normal force profiles. The embodiment attempts to reduce noise spike at 2× the commutation frequency.

Figure 21D:
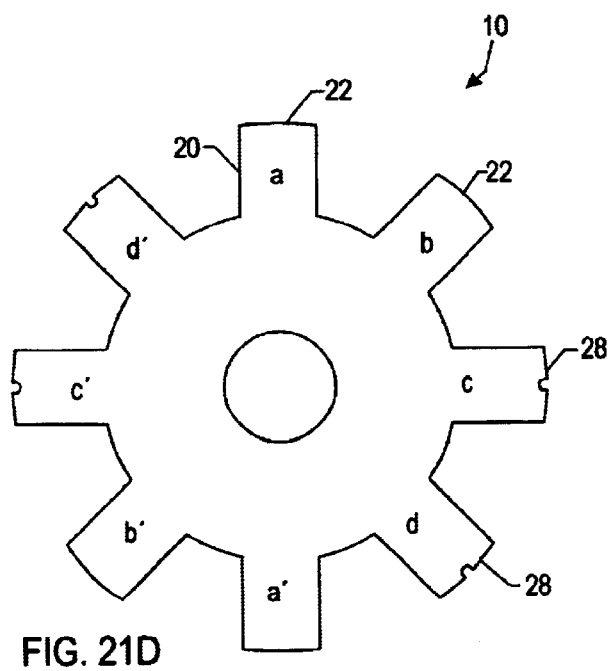

FIG. 21D shows an 8-pole rotor 10. Radially opposed rotor pole pairs 20a-a' and 20b-b' are rotor poles with standard faces 22, while radially opposed rotor pole pairs 20c-c' and 20d-d' are rotor poles with modified faces 28. The modified faces 28 define a narrow and shallow notch within the radial center of the pole face. As a result, the rotor 10 has two, adjacent groups of pole pairs that produce different normal force profiles.

Figure 21E:
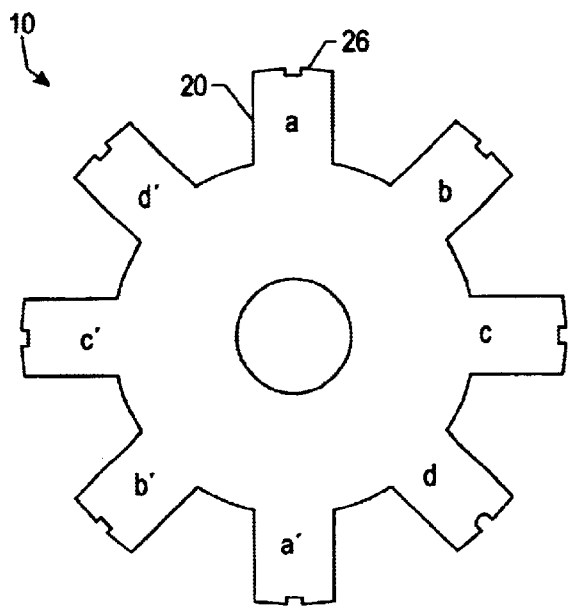

FIG. 21E shows an 8-pole rotor 10. In the present embodiment, all radially opposed rotor pole pairs 20a, b, c and d define a wide and shallow notch 26 therein. The embodiment of rotor 10 attempts to reduce noise spike at 1× the commutation frequency.

Figure 21F:
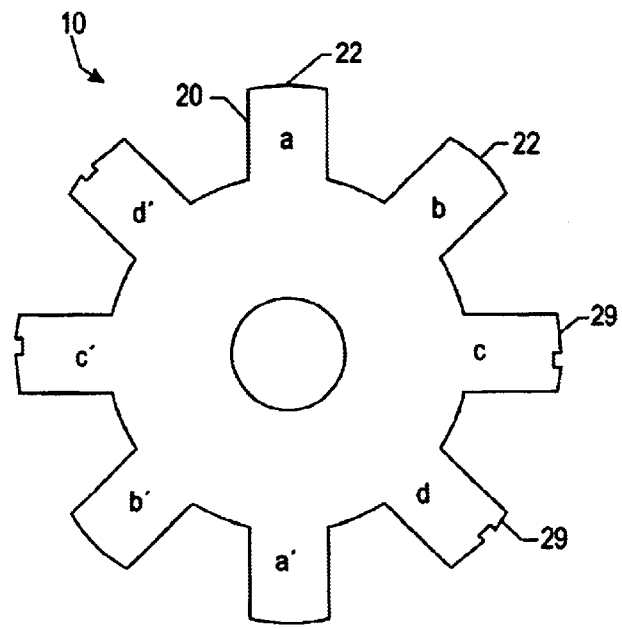

FIG. 21F shows an 8-pole rotor 10. Radially opposed rotor pole pairs 20a-a' and 20b-b' are rotor poles with standard pole faces 22, while radially opposed rotor pole pairs 20c-c' and 20d-d' are rotor poles with modified pole faces 29. The modified faces 29 define a notch offset from radial center of the pole face. As a result, the rotor 10 has two, adjacent groups of pole pairs that produce different normal force profiles.

Figure 21G:
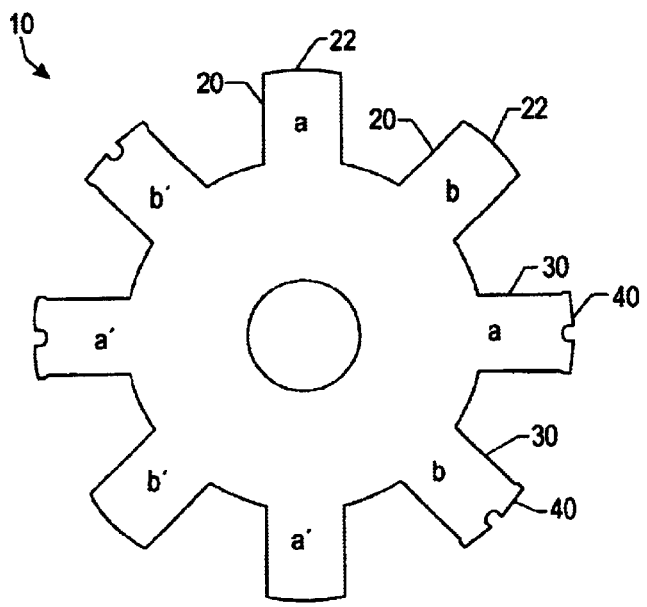

FIG. 21G shows an 8-pole rotor 10. Radially opposed rotor pole pairs 20a-a' and 20b-b' are narrow rotor poles with standard pole faces 22, while radially opposed rotor pole pairs 30a-a' and 30b-b' are wide rotor poles with modified pole faces 40. The modified faces 40 define a notch is the radial center of the pole face. The wide poles 30 form a "T"-shaped head with knobs 32 projecting tangentially from the leading and following edges of the pole face. The ratio of widths for wide pole 30 to narrow pole 20 is a small ratio, no greater than 1.5:1. A more preferable ratio is 1.3:1. The small ratio avoids the loss of efficiency of the motor, such as diminishment of the torque. With the structural combination of wide and narrow with standard and modified faces, the rotor 10 produces different normal force profiles. The embodiment helps to reduce the noise spike at 2× the commutation frequency, as well as that at the commutation frequency.

The use of wide poles with narrow poles having a ratio of approximately 1.3 to 1 (wide/narrow) does change the normal forces on adjacent stator poles of a given phase. This configuration is effective without the use of NNSS orientation of the phase poles as seen in FIGS. 4E–F. This configuration is also effective without the wide to narrow ratio of 2.0 to 1, as seen in the references to Pengov discussed in the background section of the present application.

As with any rotor pole that is wider than the stator pole, there will be times before the current reaches zero that the $$\left(\frac{dP}{dt}\right) \text{ or } \left(\frac{dL}{dt}\right)$$

will not be increasing on that particular stator pole/wide rotor pole interaction. The deleterious effect of reduced torque is minimized, because the current profile is in the decaying portion of the current. The situation is unlike that found in the prior art, such as with Pengov, that relies on the active current region when the stator pole/wide rotor pole is in a $$\left(\frac{dP}{dt}\right)$$

phase (zero torque mode).

The use of wide poles with narrow poles having a ratio of near or less than 1.3 to 1 (wide/narrow) can stand alone or be combined with notching to enhance the normal force differentiation between adjacent stator poles within a phase.

Figure 21H:
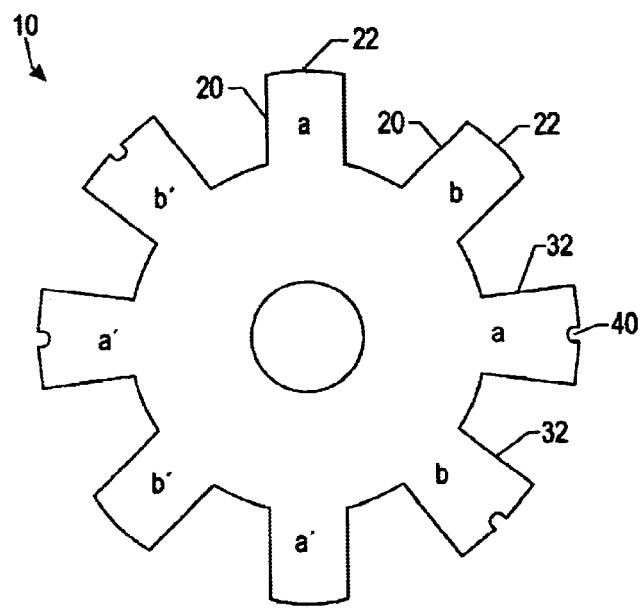

FIG. 21H shows an 8-pole rotor 10. Radially opposed rotor pole pairs 20a-a' and 20b-b' are narrow rotor poles with standard pole faces 22, while radially opposed rotor pole pairs 32a-a' and 32b-b' are wide rotor poles with modified pole faces 40. The modified faces 40 define a notch is the radial center of the pole face. The wide poles 32 form a wedge shape in cross-section with the head being wider than the base. As stated previously, the ratio of widths for wide pole 32 to narrow pole 20 is no greater than 1.5:1, and more preferably 1.3:1. The small ration avoids the loss of efficiency of the motor, such as diminishment of the torque. With the structural combination of wide and narrow with standard and modified faces, the rotor 10 produces differing normal force profiles. The embodiment helps to reduce the noise spike at 2× the commutation frequency, as well as that at the commutation frequency.

Figure 21I:
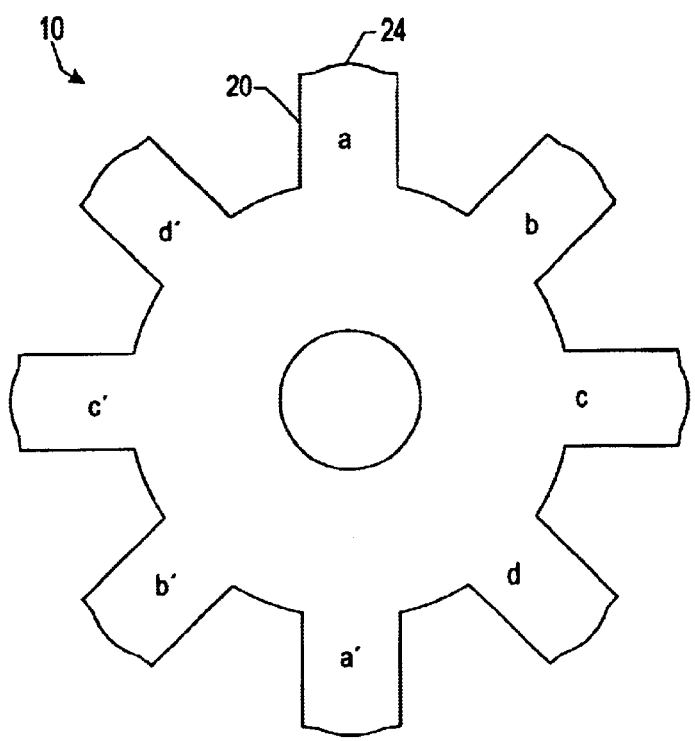

FIG. 21I shows an 8-pole rotor 10. In the present embodiment, all radially opposed rotor pole pairs 20a, b, c and d have a pole face 24 with a modification 24 thereon. The modification defines a wide, raised hub in the pole face, shown in the Figure as having a slight raised height and being radially centered on the pole face.

Figure 21J:
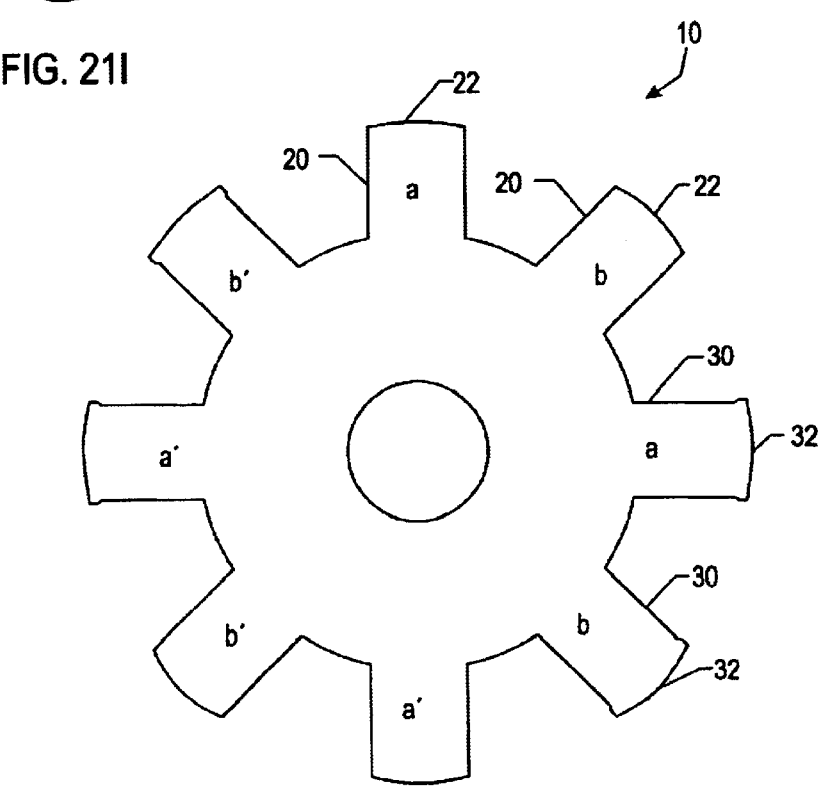

FIG. 21J shows an 8-pole rotor 10. Radially opposed rotor pole pairs 20a-a' and 20b-b' are narrow rotor poles with standard pole faces 22, while radially opposed rotor pole pairs 30a-a' and 30b-b' are wide rotor poles with standard pole faces 32. The wide poles 30 form a "T"-shaped head with knobs 32 projecting tangentially from the leading and following edges of the pole face.

Figure 21K:
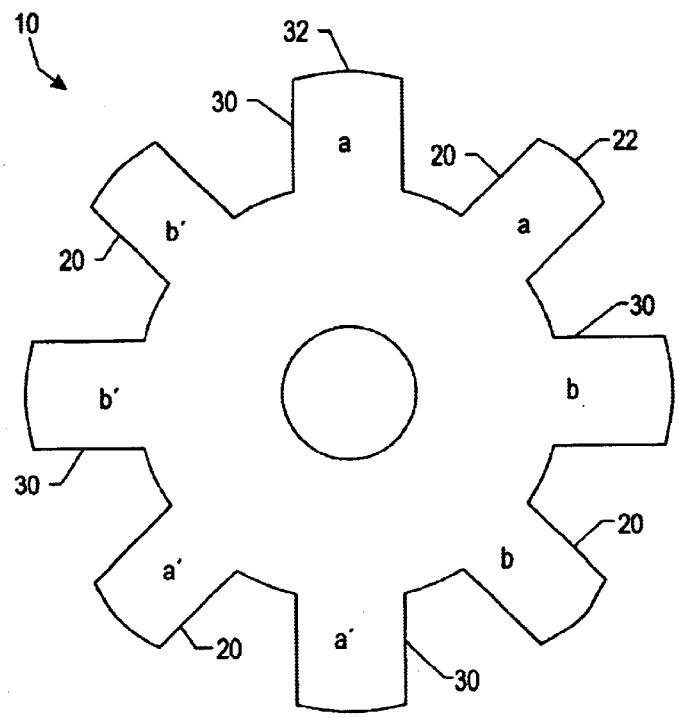

FIG. 21K shows an 8-pole rotor 10. Radially opposed rotor pole pairs 20a-a' and 20b-b' define standard rotor poles, while radially opposed rotor pole pairs 30a-a' and 30b-b' define wide rotor poles. In difference to the wide poles presented in previous embodiments, the wide poles 30 in the present embodiment have a substantially equal width running down its length from the head of the pole to its base. As stated previously, the ratio of widths for wide pole 32 to narrow pole 20 is no greater than 1.5:1, and more preferably near 1.3:1. The small ration avoids the loss of efficiency of the motor, such as diminishment of the torque. With the structural combination of wide and narrow with standard faces, the rotor 10 reduces the noise produced by a reluctance machine.

Figure 21L:
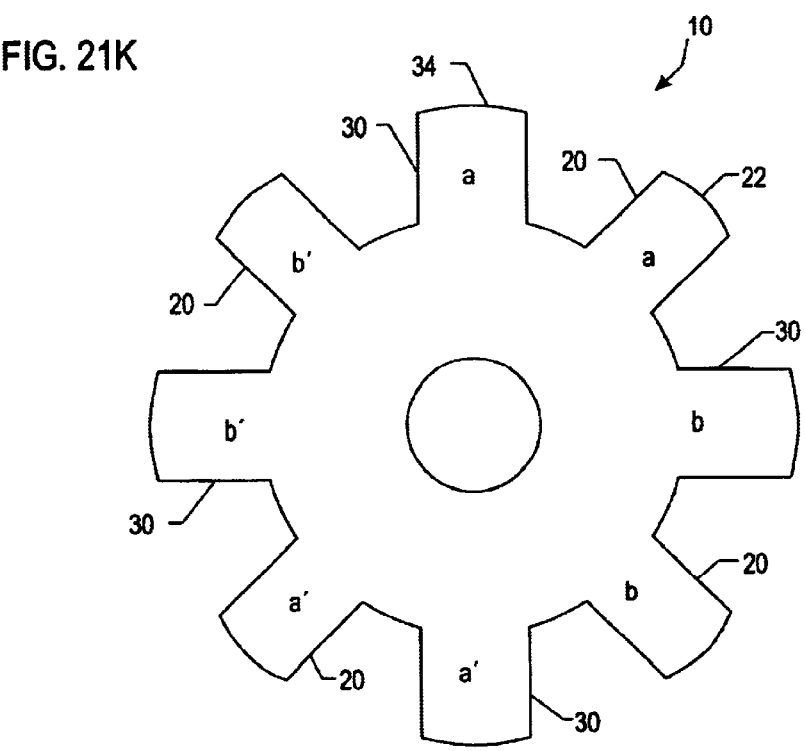

FIG. 21L shows an 8-pole rotor 10. Radially opposed rotor pole pairs 20a-a' and 20b-b' define standard rotor poles, while radially opposed rotor pole pairs 30a-a' and 30b-b' define wide rotor poles with modified faces 34. The modified face 34 defines a raised hub in face of the pole. The wide poles 30 in the present embodiment have a substantially equal width running down the length of the pole from the head to the base. With the structural combination of wide and narrow with standard and modified faces, the rotor 10 reduces the noise produced by a reluctance machine.

FIGS. 22A–C show exemplary embodiments of stators according to the present invention. Its is to be understood that the embodiments of stators constitute part of a reluctance machine and are isolated from the machine for the purposes of illustration only. Depending on the number of stator and rotor poles and phases for a given reluctance machine, the present embodiments produce unique deflection modes that can change dynamically in location or time. Although the embodiments may describe the use of one type of notch of pole width, it is conceivable that a stator can be constant having several notch types and widths in combination.

FIG. 22A shows a 12-pole stator 10. All of the radially opposed stator pole pairs 20a–f define wide, "T"-shaped poles. Additionally, radially opposed rotor pole pairs 20a–c have standard pole faces 22, while radially opposed rotor pole pairs 20d–f are modified faces 24. In the embodiment, the modified face 24 defines a deep notch in the face, radially aligned with the center of the pole face.

FIG. 22B shows a 12-pole stator 10. All of the radially opposed stator pole pairs 20a–f define wide, "T"-shaped poles. Additionally, radially opposed rotor pole pairs 20a, c and e have standard pole faces 22, while radially opposed rotor pole pairs 20b, d and f are modified faces 24. In the embodiment, the modified face 24 defines a deep notch in the face, radially aligned with the center of the pole face.

FIG. 22C shows a 12-pole stator 10. All of the radially opposed stator pole pairs 20a–f define wide, "T"-shaped poles. Additionally, all radially opposed rotor pole pairs have a deeply notched face 24.

FIG. 23A illustrates four different normal force profiles that occur with the use of narrow and wide poles having standard or modified faces. Curve 1 represents the normal force profile for a narrow pole with a standard pole face. Curve 2 represents the normal force profile for a narrow pole with a shallow notch in the pole face. Curve 2 shows a diminished magnitude in comparison to Curve 1. Curve 3 represents the normal force profile for a wide pole with a notch in the pole face. Although it begins at a higher magnitude than the standard pole of Curve 1, Curve 3 has a slightly diminished peak magnitude than the standard pole. Finally, Curve 4 represents the normal force profile for a wide pole with a standard pole face. The wide pole with unmodified face produces the highest magnitude of normal force profile.

The interrelation of the above normal force curves used in combination with or independent from previous embodiments reduces the noise produced by a reluctance machine. FIG. 23B shows exemplary experimental results of the sound pressure level produced in a range of frequencies for different pole arrangements according to the present invention.

Two configurations are depicted: narrow poles with standard pole faces and wide and narrow poles with notched pole faces. Notable differences in the sound pressure levels occur at the 1×, 2× and 1× harmonics of the commutation frequency. Narrow poles with standard pole faces, designated "Standard" in the Figure, has a largest spike of roughly 57 dB in the sound pressure level at the commutation frequency (1×). The wide and narrow poles with notched pole faces, designated "Wide-narrow plus Notched", has a smaller spike of roughly 44 dB.

At the 2× harmonic of the commutation frequency, the "Standard" pole configuration again has the largest spike of roughly 43 dB in the sound pressure level. The "Wide-narrow plus Notched" configuration has a reduced spike at the 2× harmonic of roughly 42 dB. The trend reoccurs in similar fashion with the 1× harmonic of the commutation frequency. The "Standard" pole configuration has the largest spike of 41 dB, while the "Wide-narrow plus Notched" configuration has the smallest spike of 40 dB.

Figure 23C:
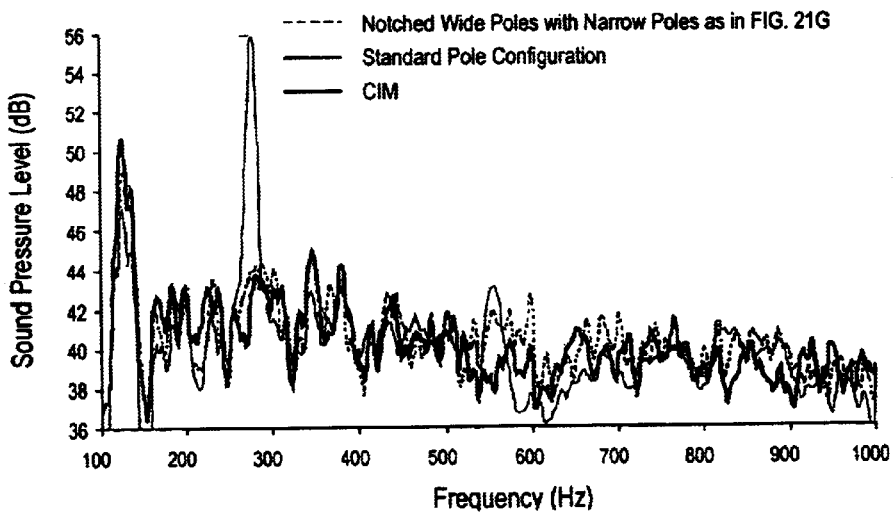

FIG. 23C shows exemplary experimental results of the sound pressure level produced in a range of frequencies for different pole arrangements according to the present invention. The values compared in FIG. 23B have been taken from the following Figure.

Three configurations are depicted. First, the sound pressure levels for wide and narrow poles with modified pole faces as in the rotor of FIG. 21G is represented by a dashed line, Curve 1. Second, the sound pressure levels for a standard pole configuration is represented by a thin, solid line, Curve 2. Third, the sound pressure levels for a controlled induction motor is represented by a bold line, Curve 3. This curve represents a standard for which those knowledgeable in the art are striving. Notable differences in the sound pressure levels occur at the 133, 2× and 3× harmonics of the commutation frequency. The most exceptional difference occurs at the commutation frequency. The standard pole configuration, Curve 2, have the largest spike at the commutation frequency (1×), roughly 275 Hz, while the other configurations, Curve 1 and 3, have recorded levels that do not show an exceptional spike at the commutation frequency.

Although the foregoing disclosure has explicitly described the present invention in terms of reluctance machines, the present invention also relates to other dynamoelectric or electromagnetic machines. For example, FIG. 24 shows a cross-sectional view of a permanent magnet electric machine. An armature 10 has a plurality of salient magnetic poles with armature windings. The salient magnetic poles project inwardly from the armature towards a permanent magnet rotor 40. Each salient pole 20 includes a base portion 22 where the windings are wound. The distal end of the base portion 22 forms a head 24. An air gap 26 lies between the face of the head portion and the rotor 40.

The salient magnetic poles are divided into three radially opposed pairs of poles 20a-a', 20b-b', and 20c-c'. Each of the radially opposed pairs is provided with a pole face. For the radially opposed pair of 20a-a', the pole faces 30 are provided. Likewise, for the radially opposed pair of 20b-b', the pole faces 32 are provided, while for the radially opposed pair of 20c-c', the pole faces 34 are provided. The permanent magnet rotor 40 has four permanent magnet poles 42 arranged as $N_1$, $S_1$, $N_2$, $S_2$.

In one embodiment, the construction of the salient pole pair 20a-a' may be different from the construction of the other salient pole pairs 20b-b' and 20c-c'. The difference in construction may be in the form of a notch in the pole face 30 as described previously. Alternatively, the difference in construction may be an increased maximum air gap 26 for the radially opposed pair 20a-a' in comparison to the air gaps for the other salient pole pairs.

Electrical solutions also exist for providing differing normal force profiles to reduce noise in the present embodiment. In yet another embodiment, the current supplied to the windings 12 wound around the stator poles may differ substantially between phases. The current that energizes the stator poles during the series of energizations can be provided with dissimilar profiles. The dissimilar current profiles can be used independent of or in conjunction with other modifications to achieve noise reduction in the machine. Still further, electrical control of the forces can be obtained by controlling the number of coil turns used in the various phase windings.

It will be appreciated that the modifications of rotor poles as described earlier in respect to reluctance machines may apply as well to the present embodiment of salient poles in the permanent magnet machine. With that understanding, it will be appreciated that the normal force profile for the radially opposed pair 20a-a' can be substantially different from the normal force profile for the other pole pairs. Furthermore, the difference in construction need not be limited to only one radially opposed pair, but may involve a second or similar modification of another radially opposed pair.

The differences in construction may also apply to the poles of the permanent magnet rotor 40. In one embodiment, the permanent magnet poles 42 designated $N_1$ and $N_2$ may be provided with a level or strength of magnetism that is substantially different than that of poles $S_1$ and $S_2$. The poles may be made of different magnetic materials. Alternatively, as shown in the present Figure, the air gaps 26 produced between the poles $N_1$ and $N_2$ with the salient poles may be smaller than the air gaps 28 produced between the poles $S_1$ and $S_2$ and the salient poles. The air gap may also be dissimilar between the pairs in that one is eccentric, while the other is not. Lastly, the widths of the poles $N_1$ and $N_2$ may be different than the width of the poles $S_1$ and $S_2$.

It will be appreciated that a number of constructions can be performed to alter the magnetic poles 42 of the rotor 40. The differing constructions may be used in isolation or in combination to produce differing normal force profiles according to the present invention. It is also understood that the number of poles depicted is strictly arbitrary and that the present invention relates to permanent magnet machines having other combinations of salient and magnetic poles and "inside-out" permanent magnet machines, having an outer shell rotor disposed around an inner stator.

FIG. 25 shows a cross-sectional side view of a linear induction machine. The motor has two stators of stationary members 10 and 20. The use of two stators eliminates the need for a reaction plate when only one stator is used. The stator 10 has a series of poles 12, and the opposed stator 20 has a like series of poles 22. The stator typically has a series of phase windings in the laminated core of the stator. In the present embodiment, the stator is wound for three phases A, B, C.

The rotor or moveable member is a conduction sheet 30 disposed between the opposing stators 10 and 20. In the linear machine, the magnetic field sweeps across the face of the conduction sheet 30. Currents induced in the sheet by the traveling field of the stator create a secondary magnetic field. The reaction between the two fields produces a linear motion in the conduction sheet 30.

Differing normal force profiles may be produced as the conduction sheet 30 travels in relation to the stators 10 and 20. In one embodiment, the stator 10 may have some poles 12 defining a pole construction 14, while other of the poles 12 may define a different pole construction 16. The differences in pole construction may involve the use of notches in the poles face, the use of differing materials to construct the poles, or a difference in air gap provided by the poles and the moveable member 30.

Also, the current supplied to the windings 14 and 24 wound around the stator poles may differ substantially between phases for providing differing normal force profiles to reduce noise in the present embodiment. The current that energizes the stator poles during the series of energizations can be provided with dissimilar profiles. The dissimilar current profiles can be used independent of or in conjunction with other modifications to achieve noise reduction in the machine. Still further, electrical control of the forces can be obtained by controlling the number of coil turns used in the various phase windings. It will be appreciated that previous modification or constructions of poles are applicable to the present embodiment.

In another embodiment, the conduction sheet may have a series of modifications 32 along its length. The modification could involve a series of notches, holes or bumps in the material to produce altering air gap profiles between the conduction sheet and the stationary poles as the moveable member moves in relation to the stationary members. Also, a different material than that of the conduction sheet may be embedded or attached is to the conduction sheet in a series of locations on the sheet. The present invention also applies to a linear machine employing permanent magnets on the moveable member.

FIG. 26 shows a cross-sectional view of a conventional induction machine according to the present invention. A stator 10 is a stack of laminations that forms an outer ring around a rotor 30. A plurality of radially opposed stator poles pairs 20a–d project inwardly to the central bore in the stator 10. Each of the stator poles 20a-a' has a stator pole face 22, while the stator poles 20b-b' have a stator pole face 24. The stator poles 20c-c' have a stator pole face 24, while the stator poles 20d-d' has a face 26. A plurality of drive windings 12 are wound about the stator poles 20 and constitute a plurality of phases around the stator 10.

The rotor 30 represents a conventional squirrel cage and includes a stack of laminations pressed onto a shaft 50. A number of short-circuited windings are embedded in the rotor 30. These rotor windings are bars or radially opposed rotor pole pairs. The rotor poles pass into the outer surface of the rotor 30 lamination and protrude beyond the rotor 30. The protruding end of the rotor poles defines a rotor pole face. The bars or rotor poles pass from one end of the stack of lamination to the other and are positioned circumscribe the outer surface of the rotor 30. Typically, the bars are skewed as they pass along the length of the rotor. A shorting-ring (not shown) connects the bars at each end.

As previously described, differing normal force profiles can be used such that the deflection of the stator can result in reduced noise by the induction machine. The differing normal forces may be accomplished in a number of ways. Focusing on the rotor in one embodiment, the construction of the squirrel cage could have a portions of greater depth 34 and 36 within the rotor laminations 30. Also, these portions 34 and 36 may present a different air gap with respect to the stator poles 20 as the poles pass in relation to one another in comparison to portions 32 and 38. Having a bars or portions that are deeper in the rotor laminations increases the amount of lamination material around that bar, consequently increasing the inductance. In yet another embodiment, some of the rotor poles pair may have a wider width than that of the other pairs.

Furthermore, the bars of the squirrel cage are usually made of aluminum, copper or brass, while the rotor lamination 30 is typically iron. In another embodiment, some of the rotor bars may be of a different material than the other pole pairs. In a further embodiment, some of the rotor poles may be provided with notched faces in order to produce the differing normal force profiles according to the present invention.

The factors of the rotor poles such as their depth within the rotor lamination 30, their overall shape, their face configuration, their material construction and their width determine inductance and resistance characteristics of the rotor poles. For instance, a bar with a large cross-sectional area will exhibit a lower resistance than a bar with a small cross-sectional area. Also, a brass bar will have a higher resistance than a copper bar of the same dimension. As is established, the normal forces between the stator and rotor result from the magnetic flux and overlap of the poles. The inductance and resistance of the rotor poles plays a role in producing those forces.

In similar fashion to other embodiments, the stator poles or drive windings of the stator may be constructed differently to produce the disparate normal force profiles according to the present invention. For example, the radially opposed pair 20a-a' may be provided with a pole face 22 that is different from the pole faces 24 and 26 of the pairs 20b-b' and 20c-c'. Further, the maximum air gap provided by the pair 20b-b' may be substantially larger than the maximum air gap produced by the other pole pairs. It is understood that a number of alternative constructions can be performed to alter the stator poles 20 and/or the rotor poles 40. The differing constructions may be used in isolation or in combination to produce differing normal force profiles according to the present invention.

In yet another embodiment, the current supplied to the windings 12 wound around the stator poles may differ substantially between phases for providing differing normal force profiles to reduce noise in the present embodiment. The current that energizes the stator poles during the series of energizations can be provided with dissimilar profiles. The dissimilar current profiles can be used independent of or in conjunction with other modifications to achieve noise reduction in the machine. Still further, electrical control of the forces can be obtained by controlling the number of coil turns used in the various phase windings.

It is also understood that the number of poles depicted in the present induction machine is strictly arbitrary and that the present invention relates to induction machines having other combinations of rotor and stator poles.

At As described, a number of novel solutions exist to reduce the noise generated by a reluctance machine in accordance with the present invention. While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A switched reluctance machine, comprising:
    a rotor defining a plurality of salient rotor poles substantially equally spaced about the rotor, each rotor pole having a pole face construction and defining an angular width, wherein the angular width of the rotor pole with the widest width is:
        (a) substantially equal to or greater than the angular width of the rotor pole with the narrowest width, and
        (b) less than 1.5 times the angular width of the rotor pole with the narrowest width;
    a stator defining at least one pair of salient stator poles, the stator poles of the at least one pair being radially opposed to one another and having substantially the same pole face construction as one another;
    a phase winding for energizing the at least one pair of stator poles over a plurality of discrete intervals, the energizing of the phase winding producing a given desired output on the rotor and producing normal forces tending to cause movement of the energized stator poles towards the rotor;
    wherein a first profile of the normal forces experienced by the at least one pair of stator poles over a first discrete interval is different from a subsequent profile of the normal forces experienced by the at least one pair of stator poles over a subsequent discrete interval.

2. The switched reluctance machine of claim 1, wherein the rotor defines a plurality of pairs of salient rotor poles, the salient rotor poles in each pair being radially opposed to one another, and wherein:

a) over the first discrete interval, a first pair of rotor poles is brought towards alignment with the at least one pair of stator poles, each rotor pole of the first pair having a first pole face construction and a first angular width substantially similar to the other radially opposed pole of the pair;

b) over the subsequent discrete interval, a second radially opposed pair of salient rotor poles is brought towards alignment with the at least one pair of stator poles, each rotor pole of the second pair having a second pole face construction and a second angular width substantially similar to the other radially opposed pole of the pair; and c) the first pole face construction of the rotor poles forming the first pair is different from the second pole face construction of the rotor poles forming the second pair.

3. The switched reluctance machine of claim 2, wherein the first angular width of the rotor poles forming the first pair is substantially the same as the second angular width of the rotor poles forming the second pair rotor poles.

4. The switched reluctance machine of claim 2, wherein a first maximum air gap established between the first pair of rotor poles and the at least one pair of stator poles is different from a second maximum air gap established between the second pair of rotor poles and the at least one pair of stator poles.

5. The switched reluctance machine of claim 2, wherein each of the rotor poles of the first pair having the first pole face construction defines a notched pole face.

6. The switched reluctance machine of claim 1, wherein each of the stator poles forming the at least one pair defines a notched pole face.

7. An switched reluctance machine comprising:

a rotor defining a plurality of salient rotor poles substantially equally spaced about the rotor, each pole having a pole face construction and an angular width, wherein the angular widths of each of the rotor poles are substantially the same;

a stator a plurality of salient stator poles substantially equally spaced about the stator, the plurality of salient stator poles forming:

a first radially opposed pair of salient stator poles, each stator pole of the first pair having a first pole face construction substantially similar to the other pole of the pair, and a second radially opposed pair of salient stator poles, each stator pole of the second pair having a second pole face construction substantially similar to the other pole of the pair; and at least one current carrying member for simultaneously energizing the first and second pairs of stator poles over a plurality of discrete intervals, the energizing of the current carrying member producing a given desired output on the rotor and producing normal forces tending to cause movement of the energized stator poles towards the rotor;

wherein a first profile of the normal forces experienced by the first pair of stator poles over one of the discrete intervals is substanially different from a second profile of the normal forces experienced by the second pair of stator poles over the same discrete interval.

8. The switched reluctance machine of claim 7, wherein the first pole face construction of the stator poles forming the first pair is different from the second pole face construction of the stator poles forming the second pair.

9. The switched reluctance machine of claim 8, wherein each of the stator poles of the first pair having the first pole face construction defines a notched pole face.

10. The switched reluctance machine of claim 9, wherein the pole face construction of each of the rotor poles is substantially the same.

11. A switched reluctance machine, comprising:

a rotor defining a plurality of salient rotor poles, the plurality of salient rotor poles substantially equally spaced about the rotor and having substantially the same angular width as one another, the plurality of salient rotor poles forming:

a first pair of salient rotor poles being radially opposed to one another and having a first pole face construction substantially similar to one another, and a second pair of salient rotor poles being radially opposed to one another and having a second pole face construction substantially similar to one another, the second pole face construction being different from the first pole face construction;

a stator defining a plurality of salient stator poles substantially equally spaced about the stator and having substantially the same pole face construction as one another, the plurality of salient stator poles forming a first pair of salient stator poles being radially opposed to one another and forming a second pair of salient stator poles being radially opposed to one another; and at least one current carrying member for simultaneously energizing the first and second pairs of salient stator poles over a plurality of discrete intervals, the energizing of the at least one current carrying member producing a given desired output on the rotor and producing normal forces tending to cause movement of the energized stator poles towards the rotor, wherein the first pair of rotor poles having the first pole face construction is brought towards alignment with the first pair of stator poles over one discrete interval;

wherein the second pair of rotor poles having the second pole face construction is brought towards alignment with the second pair of stator poles over the same discrete interval; and wherein a first profile of the normal forces experienced by the first pair of stator poles over the one discrete interval is substantially different from a second profile of the normal forces experienced by the second pair of stator poles over the same discrete interval.

* * * * *